(12) United States Patent
Park et al.

(10) Patent No.: US 12,026,397 B2
(45) Date of Patent: Jul. 2, 2024

(54) HYBRID MEMORY MODULE HAVING A VOLATILE MEMORY SUBSYSTEM AND A MODULE CONTROLLER CONFIGURABLE TO PROVIDE DATA TO ACCOMPANY EXTERNALLY SOURCED DATA STROBES TO THE VOLATILE MEMORY SUBSYSTEM

(71) Applicant: Netlist, Inc., Irvine, CA (US)

(72) Inventors: Jeekyoung Park, Irvine, CA (US);
Jordan Horwich, Irvine, CA (US)

(73) Assignee: Netlist, Inc., Irvine, CA (US)

( * ) Notice: Subject to any disclaimer, the term of this patent is extended or adjusted under 35 U.S.C. 154(b) by 0 days.

(21) Appl. No.: 18/059,966

(22) Filed: Nov. 29, 2022

(65) Prior Publication Data

US 2023/0280937 A1   Sep. 7, 2023

Related U.S. Application Data

(63) Continuation of application No. 17/023,302, filed on Sep. 16, 2020, now Pat. No. 11,513,725.

(60) Provisional application No. 62/901,221, filed on Sep. 16, 2019.

(51) Int. Cl.
*G06F 3/06* (2006.01)

(52) U.S. Cl.
CPC ......... *G06F 3/0656* (2013.01); *G06F 3/0604* (2013.01); *G06F 3/0613* (2013.01); *G06F 3/0635* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 11,372,786 B2 * | 6/2022 | Ootomo | G06F 13/4027 |
| 2006/0158214 A1 * | 7/2006 | Janzen | G11C 7/1057 |
| | | | 326/30 |
| 2007/0028027 A1 * | 2/2007 | Janzen | G06F 13/1684 |
| | | | 711/105 |
| 2007/0186072 A1 * | 8/2007 | Woo | G06F 13/4243 |
| | | | 711/167 |
| 2010/0215118 A1 * | 8/2010 | Ware | H03M 5/16 |
| | | | 375/295 |

(Continued)

*Primary Examiner* — Tracy C Chan
(74) *Attorney, Agent, or Firm* — USCH Law, PC

(57) ABSTRACT

A memory module according to some embodiments is operable in a computer system including a memory controller coupled to a memory channel. The memory module comprises a volatile memory subsystem, non-volatile (NV) memory subsystem and a module controller coupled to the volatile memory subsystem and the NV memory subsystem. The volatile memory subsystem includes dynamic random access memory (DRAM) devices and is configurable to communicate with the memory controller via the memory channel during memory read or write operations. The module controller is configured to output data strobe signals to accompany data from the volatile memory subsystem during a memory read operation and to output to accompany data strobes output by data buffers in response to data strobe signals from the memory controller during a system-initiated operation to transfer data from the NV memory subsystem to the volatile memory subsystem.

20 Claims, 21 Drawing Sheets

(56) References Cited

U.S. PATENT DOCUMENTS

| | | | | |
|---|---|---|---|---|
| 2013/0046941 A1* | 2/2013 | Ma | ............... | G06F 11/1004 |
| | | | | 711/155 |
| 2014/0337539 A1* | 11/2014 | Lee | ............... | G11C 29/028 |
| | | | | 710/5 |
| 2015/0003175 A1* | 1/2015 | Ramanujan | ......... | G06F 12/0851 |
| | | | | 365/189.17 |
| 2015/0046616 A1* | 2/2015 | Pedersen | ............... | G06F 13/362 |
| | | | | 710/110 |
| 2016/0019138 A1* | 1/2016 | Lee | ............... | G06F 3/0685 |
| | | | | 711/103 |
| 2016/0162404 A1* | 6/2016 | Lee | ............... | G11C 7/1093 |
| | | | | 711/120 |
| 2016/0188252 A1* | 6/2016 | Lee | ............... | G06F 3/0671 |
| | | | | 711/103 |
| 2021/0193245 A1* | 6/2021 | Ryu | ............... | G11C 7/1057 |
| 2021/0279194 A1* | 9/2021 | Chen | ............... | G06F 12/0246 |

* cited by examiner

HYBRID MEMORY MODULE HAVING A VOLATILE MEMORY SUBSYSTEM AND A MODULE CONTROLLER CONFIGURABLE TO PROVIDE DATA TO ACCOMPANY EXTERNALLY SOURCED DATA STROBES TO THE VOLATILE MEMORY SUBSYSTEM

CROSS REFERENCE TO RELATED APPLICATIONS

The present application is a continuation of U.S. patent application Ser. No. 17/023,302, filed on Sep. 16, 2020, entitled "Hybrid Memory Module with Data Buffering," which claims priority to U.S. Provisional Patent Application No. 62/901,221, filed Sep. 16, 2019, entitled "Hybrid Mobile Memory Module with Data Buffering," each of which is incorporated herein by reference in its entirety.

The present application is related to U.S. patent application Ser. No. 14/706,873, filed May 7, 2015, entitled "Memory Module Having Volatile and Non-Volatile Memory Subsystems and Method Of Operation," now U.S. Pat. No. 10,198,350, which claims the benefit priority to U.S. Provisional Patent Application No. 62/150,272, filed Apr. 20, 2015, entitled "Hybrid Memory Module for Computer System," and is a continuation-in-part of U.S. patent application Ser. No. 14/536,588, filed Nov. 7, 2014, entitled "Hybrid Memory Module and System and Method of Operating the Same," now U.S. Pat. No. 10,380,022, which claims the benefit of U.S. Provisional Patent Application No. 62/067,411, filed Oct. 22, 2014, entitled "Hybrid Mobile Memory for Random Access," U.S. Provisional Patent Application No. 62/056,469, filed Sep. 26, 2014, entitled "Memory Channel Storage," U.S. Provisional Patent Application No. 62/041,024, filed Aug. 22, 2014, entitled "Apparatus and Methods for Transferring Storage Content," U.S. Provisional Patent Application No. 61/989,941, filed May 7, 2014, entitled "High Density Hybrid Memory Systems," U.S. Provisional Patent Application No. 61/929,942, filed Jan. 21, 2014, entitled "Memory Channel Storage," and U.S. Provisional Patent Application No. 61/901,439, filed Nov. 7, 2013, entitled "Dynamic Random Access to Non-Volatile Memory." Each of the above applications is incorporated herein by reference in its entirety.

The present application is also related to U.S. Provisional Patent Application No. 61/512,871, filed Jul. 28, 2011, entitled "High Density DIMMs," and U.S. patent application Ser. No. 13/559,476, filed Jul. 26, 2012, entitled "Flash DRAM Hybrid Memory Module," now U.S. Pat. No. 8,874,831, each of which is incorporated herein by reference in its entirety.

FIELD

The disclosure herein is related generally to memory modules, and more particularly to hybrid memory modules with data buffering, and system and method of operating the same.

BACKGROUND

Memory modules including dynamic random-access memory (DRAM) devices have long been used as system memories in computer systems such as network servers, personal computers, PDAs, mobile phones, video games, scientific instruments, industrial robotics, medical electronics, and so on, DRAM is a type of random-access memory that stores each bit of data in a separate capacitor in an integrated circuit. The capacitor can be either charged or discharged so that these two states are taken to represent the two values of a bit, conventionally called 0 and 1. Since capacitors often leak charge, the information eventually fades unless the capacitor charge is refreshed periodically. Because of this refresh requirement, it is a dynamic memory as opposed to SRAM and other static memory.

The structural simplicity of DRAM allows DRAM chips to reach very high densities, because billions of transistor and capacitor pairs can fit on a single memory chip. On the other hand, DRAM is volatile memory—it loses its data quickly when power is removed, as opposed to non-volatile memory, such as Flash memory, which is a type of electronic non-volatile computer storage medium that can be electrically erased and reprogrammed and which keeps stored information even during power failure. DRAM is also much more expensive. For example, high density DRAM can cost as much as 20 times more than high-performance Flash devices. Furthermore, Flash memory chips can have much higher density than DRAM chips, allowing a same-sized memory module to have a much larger memory capacity.

SUMMARY

According to some embodiments, a memory module including DRAM devices is operable in a computer system, the computer system including a memory controller coupled to a memory channel, the memory channel including a data bus and a control/address (C/A) bus. The memory module allows independent control of data paths and strobe paths between the DRAM devices and the data bus to facilitate smooth transition between various operations. In some embodiments, the memory module comprises a volatile memory subsystem, non-volatile (NV) memory subsystem and a module controller coupled to the volatile memory subsystem and the NV memory subsystem. The volatile memory subsystem is configurable to communicate with the memory controller via the memory channel during memory read or write operations. The module controller is configured to output first strobe signals to accompany first data signals from the volatile memory subsystem during a memory read operation and to output second strobe signals together with second data signals carrying data from the non-volatile memory subsystem during a system-initiated NV read operation.

In some embodiments, a memory module comprises a volatile memory subsystem configurable to be coupled to the memory channel, the volatile memory subsystem including dynamic random access memory (DRAM) devices, a module controller coupled to the volatile memory subsystem, first strobe paths between the DRAM devices and the data bus, and second strobe paths between the module controller and the data bus. The memory module is configurable to perform a memory write operation during which write data from the memory controller is provided to the volatile memory subsystem together with write strobes transmitted via the first strobe paths, and a memory read operation during which read data from the volatile memory subsystem is output onto the data bus together with read strobes transmitted via the second strobe paths.

In some embodiments, the memory module further comprises a non-volatile (NV) memory subsystem coupled to the module controller. The memory module is configurable to perform a data transfer write operation during which NV data from the NV memory subsystem is transferred to the volatile memory subsystem. The NV data is provided to the volatile memory subsystem together with NV write strobes transmitted via the first strobe paths. In some embodiments, the volatile memory subsystem is configurable to receive the NV data in accordance with the NV write strobes in response to receiving a dummy write memory command from the memory controller via the C/A bus.

In some embodiments, the memory module is further configurable to perform a NV write operation, during which NV write data from the memory controller is written into the NV memory subsystem. The NV write data is provided to the module controller together with NV write strobes transmitted via the second strobe paths.

In some embodiments, the memory module is further configurable to perform a NV read operation, during which NV read data from the non-volatile memory subsystem is output onto the data bus together with NV read strobes transmitted via the second strobe paths.

In some embodiments, the memory module is further configurable to perform a data transfer read operation during which DRAM data from the volatile memory subsystem is transferred to the NV memory subsystem. The DRAM data is provided to the module controller and is output onto the data bus together with read strobes transmitted via the second strobe paths.

In some embodiments, the memory module further comprises data paths to transmit the write data and the read data, and the first strobe paths are configurable to be enabled or disabled independently of the data paths being enabled or disabled.

In some embodiments, the volatile memory subsystem further comprises first data buffers configurable to provide the first strobe paths, and second data buffers configurable to provide the second strobe paths and the data paths.

In some embodiments, the DRAM devices are arranged in one or more ranks, and the volatile memory subsystem further comprises data buffers coupled between respective sections of the DRAM devices and respective segments of the data bus. Each respective data buffer of the data buffers is configurable to provide a respective set of the data paths, a respective set of the first strobe paths and a respective set of the second strobe paths.

In some embodiments, the volatile memory subsystem further includes a register control device configured to register C/A signals from the C/A bus, and each data buffer is configurable to enable some or all of the respective set of the data paths, the respective set of the first strobe paths and the respective set of the second strobe paths in response to data buffer control signals received from one or both of the register control device and the module controller.

In some embodiments, a data buffer comprises a data path configurable to transmit read or write data, a first strobe path configurable to transmit first read or write strobes, a second strobe path configurable to transmit second read or write strobes, and control circuits configured to control the data path, the first strobe path and the second strobe path in response to control signals received by the data buffer. The first strobe path is configurable to be enabled or disabled by the control circuits independently of the data path being enabled or disabled by the control circuits.

In some embodiments, the first strobe path is configurable to be enabled or disabled by the control circuits independently of the second strobe path being enabled or disabled by the control circuits.

In some embodiments, the control circuits are configurable to: enable the data path to transmit write data and at least one of the first strobe path and the second strobe path to transmit write strobes in response to control signals including a first command; enable the first strobe path to transmit additional write strobes, and disable the second strobe path and the data path in response to control signals including a second command; and enable the data path to transmit read data and the second strobe path to transmit read strobes, and disable the first strobe path, in response to control signals including a third command.

In some embodiments, the first strobe path is in a first integrated circuit and the second strobe path and the data path are in a second integrated circuit.

In some embodiments, the first integrated circuit and the second integrated circuit are identical.

In some embodiments, the control circuits include first control circuits in the first integrated circuit and second control circuits in the second integrated circuit, and wherein the control signals include a first set of control signals received by the first integrated circuit and a second set of control signals received by the second integrated circuit.

In some embodiments, a method is performed by a memory module operable in a computer system. The computer system includes a memory controller coupled to a memory channel, the memory channel including a data bus and a control/address (C/A) bus. The memory module includes volatile memory subsystem coupled to the memory channel and a module controller coupled to the volatile memory subsystem, the volatile memory subsystem including dynamic random access memory (DRAM) devices. The method comprises: performing a memory write operation, including receiving write data and write strobes from the memory controller via the data bus, and providing the write data and the write strobes to the volatile memory subsystem; and performing a memory read operation, including outputting read data from the volatile memory subsystem onto the data bus together with read strobes from the module controller.

In some embodiments, the memory module further comprises a non-volatile (NV) memory subsystem coupled to the module controller, and the method further comprises: performing a data transfer write operation, including transferring NV data from the NV memory subsystem to the module controller; receiving NV write strobes from the memory controller; and providing the NV data to the volatile memory subsystem together with NV write strobes.

In some embodiments, the method further comprises, at the volatile memory subsystem: receiving a dummy write memory command from the memory controller via the C/A bus, and receiving the NV data in accordance with the NV write strobes in response to receiving a dummy write memory command from the memory controller via the C/A bus.

In some embodiments, the method further comprises performing a data transfer read operation, including reading DRAM data from the volatile memory subsystem, providing the DRAM data to the module controller, and outputting the DRAM data onto the data bus together with read strobes from the module controller.

DESCRIPTION OF THE EMBODIMENTS

Figure 1:
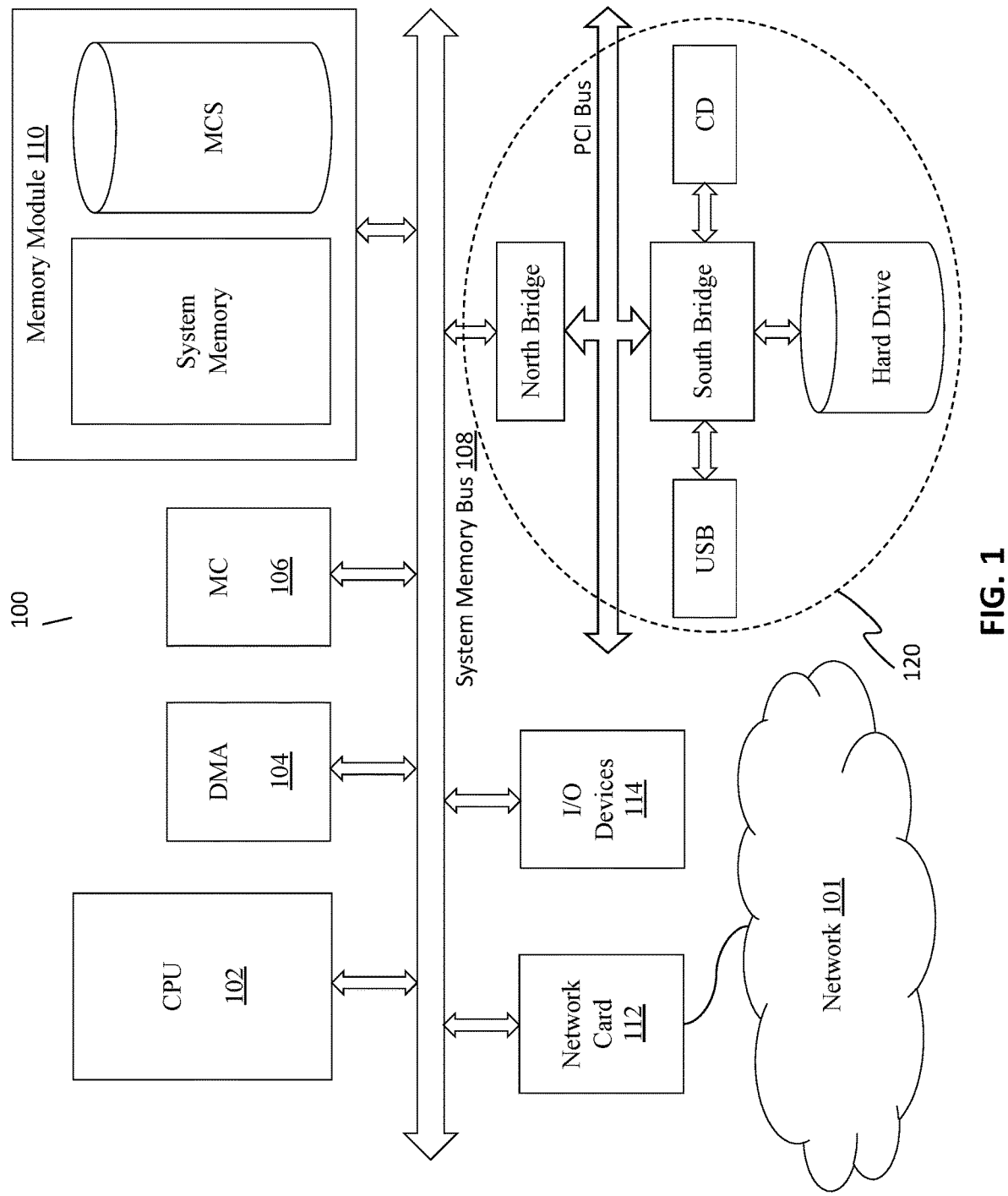
FIG. 1 is a schematic diagram of a computer or server system according to certain embodiments.

As shown in FIG. 1, a computer or server system (computer system) 100 according to certain embodiments includes a central processing unit (CPU) or processor 102, a memory controller (MC) 106, a system memory bus 108, one or more memory modules 110 coupled to the memory controller 106 via the system memory bus 108. The one or more memory modules 110 include one or more hybrid dual in-line memory modules (HybriDIMM™), which provide a system memory, and may further provide memory channel storage (MCS) and/or non-volatile back-up memory. In certain embodiments, the MC 106 may be integrated into the CPU 102. In further embodiments, the computer system may also include a direct data management controller (DMA) 104 also coupled to the system bus 108. The CPU 102 with or without the MC 106 and/or the DMA 104, or the computer system 100 in part or in while, is sometimes referred to hereafter as the "System" or "system."

In certain embodiments, the computer system 100 may further include a network card 112 and one or more I/O devices 114 such as keyboard, monitor, touchscreen, microphone, speaker, etc. The network card 112 may or may not be integrated into the CPU and provides network interface functions (wired or wireless) between the computer system 100 and local and/or wide area networks 101. The computer system 100 may further include peripheral components 120, such as a PCI bus, which is coupled to a north bridge, which is coupled to the memory controller via the memory bus or incorporated into the memory controller. One or more storage devices, such as a hard drive, a CD/DVD drive, and a USB drive, via a south bridge are coupled to the PCI bus.

Figure 2:
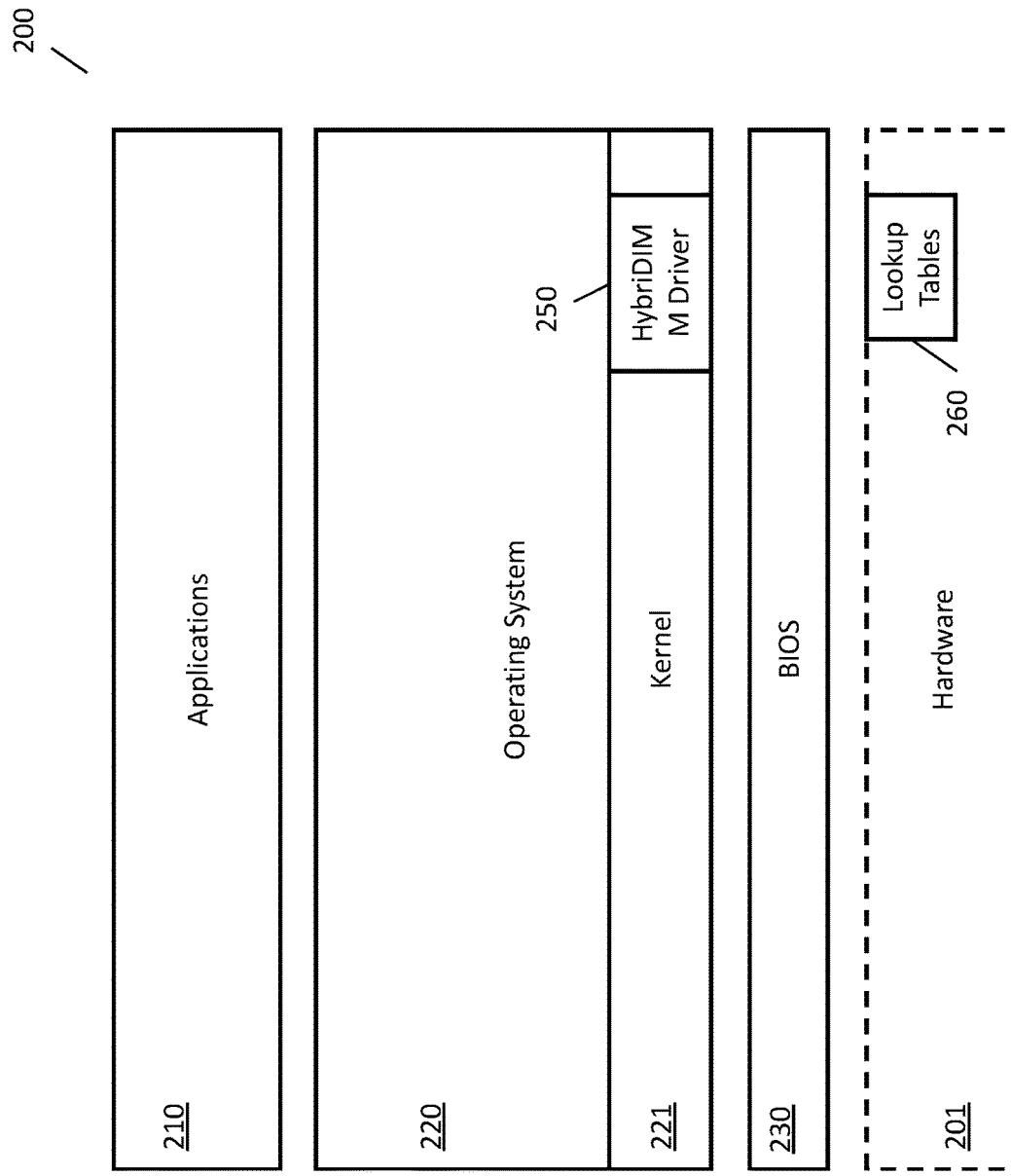
FIG. 2 is an illustration of a software stack of the computer or server system according to certain embodiments.

In addition to the hardware components shown in FIG. 1, the computer system 100 also includes software/firmware components. In certain embodiments, as shown in FIG. 2, the software/firmware components can be roughly represented as a stack of software/firmware layers 200 over a hardware layer 201. In some embodiments, the stack of software/firmware layers 200 includes an applications layer 210 sitting on an operating system layer 220. The applications 210 are software programs that perform specific tasks. The operating system 220 manages the hardware and software resources of the computer system 100 and acts as an intermediary between the application programs 210 and the hardware components of the computer system 100.

The operating system 220 includes a kernel 221, which are computer programs that manages input/output requests from other software programs (or processes), and which translates the requests into data processing instructions for the CPU and/or other hardware components of the computer system 100. The kernel can include an interrupt handler that handles all requests or completed I/O operations that compete for the kernel's services, a scheduler that determines which programs share the kernel's processing time in what order, and a supervisor that actually gives use of the computer to each process when it is scheduled. The kernel may also include a manager of the operating system's address spaces in memory or storage. The kernel's services are requested by other parts of the operating system or by applications through a specified set of program interfaces sometimes referred to as system calls.

Between the kernel and the hardware layer is the basic input/output system (BIOS) layer 230, which in certain embodiments is firmware stored in some sort of permanent memory (e.g., programmable read-only memory (PROM), or electrically programmable read-only memory (EPROM)), or Flash memory, and includes program codes for initializing and testing the system hardware components, and to load the operating system from a mass memory device when the computer system 100 is boot up. The BIOS may additionally provide an abstraction layer for the hardware components so as to provide a consistent way for application programs and operating systems to interact with the hardware components such as the system memory and input/output devices.

In certain embodiments, the software stack further includes an HybriDIMM driver 250 in, for example, the kernel. The HybriDIMM driver 250 is a software program for controlling system access to the HybriDIMM memory module so that the HybriDIMM memory module can operate like a standard Dual In-Line Memory Module (DIMM), such as Double Data Rate (DDR) 3 registered DIMM (RDIMM), or DDR3 Load Reduction DIMM (LRDIMM), DDR4 RDIMM, or DDR4 LRDIMM, without requiring any changes to the BIOS. The HybriDIMM driver 250 has access to a memory space 260 in the CPU and certain memory locations used to store lookup tables or other configuration information, which the HybriDIMM driver 250 can consult with and/or update as needed. In certain embodiments, the driver intercepts certain system calls to access the HybriDIMM memory module and directs the memory controller to send control, address and data signals in response to the system calls and in compliance with the memory interface standard the system is using (e.g., the Joint Electron Device Engineering Council (JEDEC) DDR3 RDIMM Standard, JEDEC DDR4 RDIMM Standard, or JEDEC DDR4 LRDIMM Standard), as discussed in further detail below.

Figure 3:
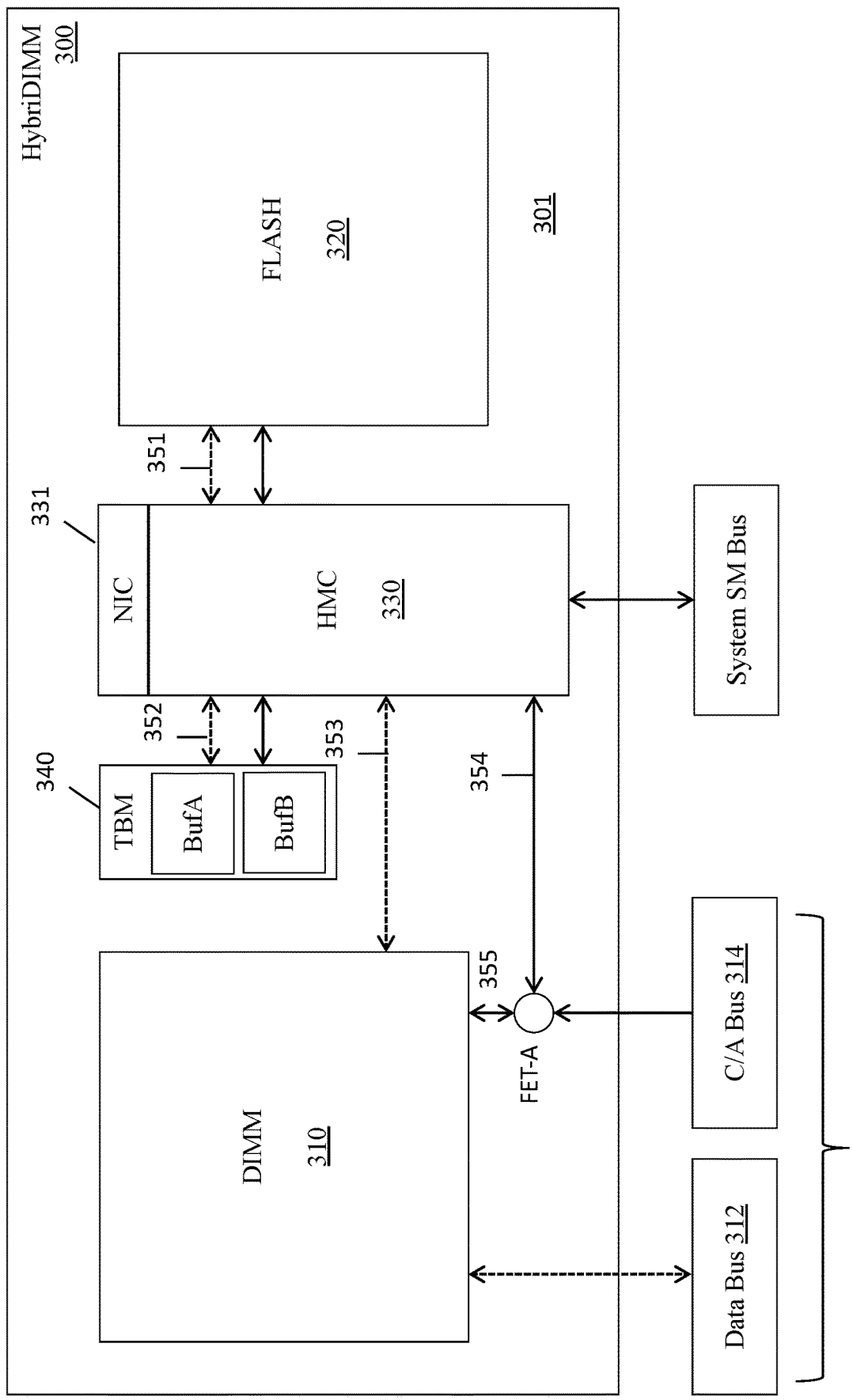
FIG. 3 is a schematic diagram of a memory module having both a volatile memory subsystem (DRAM) and a non-volatile memory subsystem (NVM) according to certain embodiments.

FIG. 3 is a schematic diagram of a HybriDIMM memory module 300, which can be used to provide the system memory and/or the MCS of the computer/server system 100 according to certain embodiments. As shown in FIG. 3, the HybriDIMM 300 includes a volatile memory subsystem (which may include dynamic random access memory or DRAM devices) 310, a non-volatile memory subsystem (or NVM) 320, and a HybriDIMM module control subsystem (HMC) 330, mounted on a module board 301, which may include one or more printed circuit boards. The HybriDIMM 300 may also include buffer memory (e.g., Terabyte buffer memory or TBM) 340, and may also include a network interface circuit (NIC). The HybriDIMM 300 may also include signal routing circuitry including, for example, signal lines 351-355, switching circuits (e.g., Field-effect transistor or FET switches) and/or multiplexors, that routes signals between the volatile memory subsystem (or DRAM) 310 and the system memory bus, the DRAM 310 and HMC 330, the buffer memory 340 and the HMC 330, the HMC 330 and the system memory bus, and/or the HMC and the NVM 320. Signal lines 351-355 further include data/strobe signal lines (as represented by the dashed lines) and control/address (C/A) signals lines (as represented by the solid lines).

As shown in FIG. 3, the HybriDIMM 300 is coupled to the system memory bus and may be further coupled to a system management (SM) bus using, for example, the I2C protocol or a variant thereof. The system memory bus includes control/address (C/A) signal lines and data/strobe (DQ/DQS) signal lines. The C/A signal lines are coupled to the register control device (RCD) in the DRAM 310 during normal operations, and are further coupled to the HMC 330. Thus, both the RCD and the HMC 330 may respond to C/A signals from the system. In certain embodiments, a switching circuits (e.g., FET-A) can be controlled by the HMC 330 to couple the RCD to either the C/A bus or the HMC 330 such that the DRAM 310 either responds to C/A signals from the system during memory operations when the system accesses the memory spaces in the HybriDIMM 300, or to C/A signals from the HMC 330 during, for example, backup/restore operations when the HybriDIMM 300 backs up the content in the DRAM 310 after a power failure or restore the content back into the DRAM after power is resumed.

In certain embodiments, the HMC 330 is configured to monitor the C/A signals from the memory controller and to recognize and act upon C/A signals for accessing the non-volatile memory subsystem (or NVM) 320 and/or the buffer memory 340.

In certain embodiments, the buffer memory 340 includes DRAM, such as terabyte DRAM memory (TBM), or SRAM. The buffer memory 340 is used to temporarily store data so as to make data transfers in the buffer memory 340 faster and more efficient. Since normally data may be transferred in and out of Flash memory at a slower speed than data is transferred to and from the system, the buffer memory 340 is used to buffer data to/from the Flash memory so the system does not have to slow down and wait for data to be written to or read from the NVM 320. When the system writes data to the NVM 320, the data is buffered into the buffer memory 340 at DRAM data I/O speed, which is much faster than Flash data I/O speed. The buffered data can be written into the Flash memory on, for example, First-in First-out (FIFO) basis. The same is true for the read direction. Thus, while reading from the NVM 320, the CPU can engage in other processes with the main memory (e.g., DRAM 310) until the buffer memory 340 has buffered a predetermined amount of data for transferring to the main memory or the system at the DRAM speed. On the other hand, when data is transferred from the main memory to the storage, the data is read from the DRAM 310 according to a set of control/address (C/A) signals from the system or the HMC 330, and written into the buffer memory 340 according to another set of C/A signals from the HMC 330. While the DRAM can be engaged with the system on other tasks, the HMC 330 can transfer the data from the buffer memory 340 to the NVM 320 by reading the data from the buffer memory 340 and writing the data to the storage. In further embodiments, the buffer memory 340 may include two sets of buffer memory, BufA and BufB.

In certain embodiments, the DRAM 310 may include multiple ranks (e.g., DRAM R0 and DRAM R1) of double data rate (e.g., DDR3 or DDR4) synchronous DRAM devices and a register control device (RCD). In certain embodiments, the NVM 320 may include any form of storage media, be it volatile or non-volatile, including but not limited to NAND Flash, MRam, NRAM®, SDRAM, SRAM, 3d-XPoint™ devices. In some embodiments, the NVM 320 includes MLC NAND Flash, which are partitioned to support fast access as well as enhance the error correction capability for virtual duplication. In certain embodiments, the MLC NAND Flash may includes a number of (e.g., 9) standard embedded multi-media card (eMMC) packages each having an embedded multi-media interface, as described in U.S. patent application Ser. No. 14/536,588, filed Nov. 7, 2014, entitled "Hybrid Memory Module and System and Method of Operating the Same," which is incorporated herein by reference.

In certain embodiments, the HybriDIMM 300 further includes a serial presence detect (SPD) device 370 accessible by the system via the SM bus. The SPD device 370 includes non-volatile memory such as electrically erasable and programmable read only memory (EEPROM) for storing therein key parameters of the HybriDIMM 300, such as basic memory type, module data widths, timing parameters, memory density (e.g., size of each bank), manufacturer ID, serial number, etc. These key parameters are generally written by the manufacturers. During system boot up, the BIOS reads the SPD information to configure the memory controller.

The components in the HybriDIMM 300, e.g., the HMC 330, the main memory subsystem (or volatile memory subsystem), the buffer memory 340, the NVM 320 (or non-volatile memory subsystem), can be mounted on a same printed circuit board or disposed in close proximity to each other to allow fast and smooth data transfer therebetween.

Figure 4:
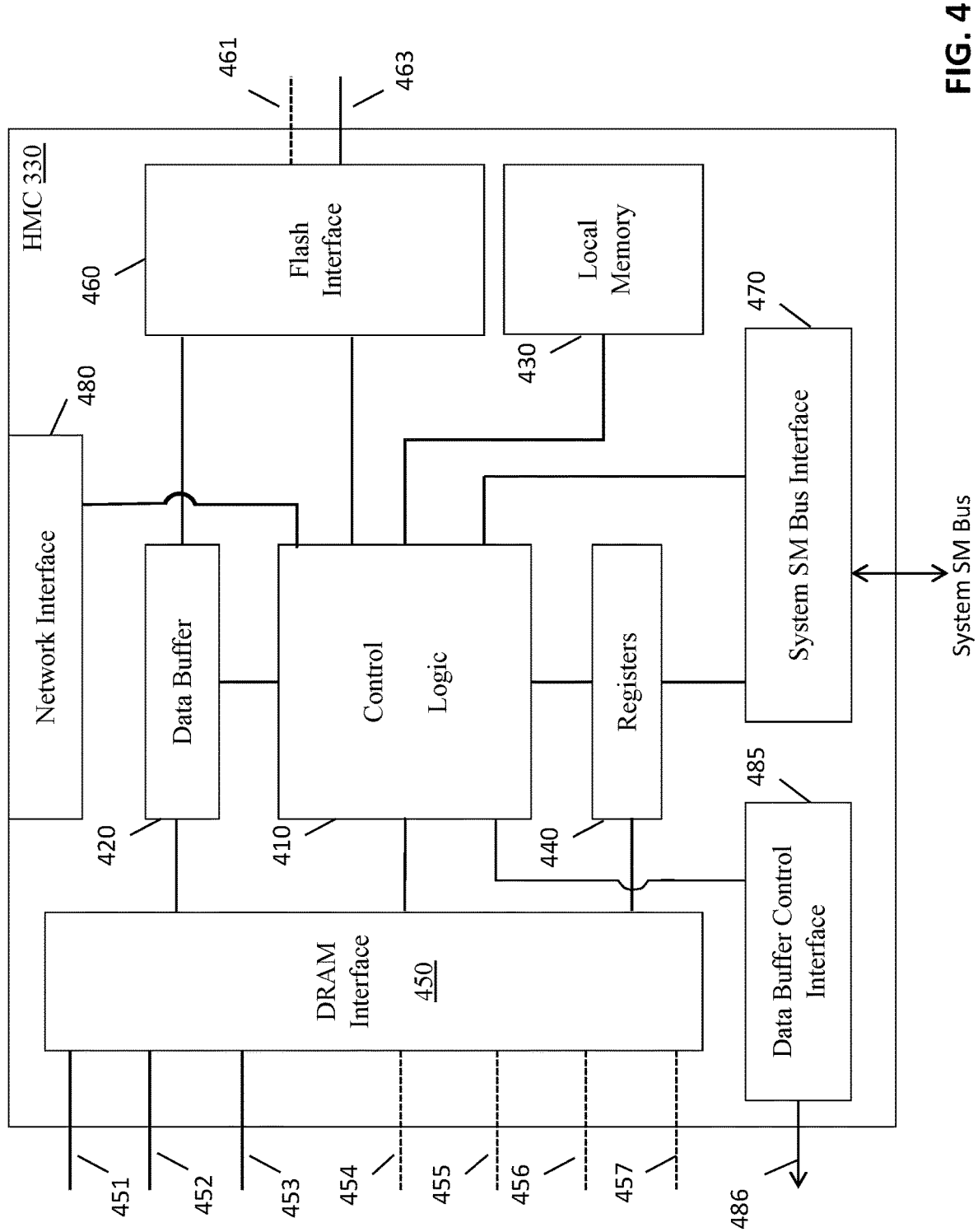
FIG. 4 is a schematic diagram of a module controller in the memory module according to certain embodiments.

FIG. 4 is a schematic diagram of the HMC 330 according to certain embodiments. The HMC 330 can be implemented using one or more application-specific integrated circuits (ASIC) and/or programmable field gate array (FPGA) devices. As shown in FIG. 4, the HMC 330 includes control logic 410, a data buffer 420, local memory 430 and registers 440. The HMC 330 further includes a DRAM interface 450, a NVM interface 460, a system management Bus interface 470, and a network interface 480. In certain embodiments, the HMC 330 controls data transfers between the DRAM 310 and NVM 320. It keeps an address management table in the local memory on-chip memory space, operates the switching circuit FET-A, and generates proper commands and address signals to the DRAM 310, NVM 320 and the buffer memory 340 to control the data transfers therebetween.

In certain embodiments, the NVM interface is coupled to the NVM 320 via data signal lines 461 and control/address signals lines 463, the DRAM interface 450 provides multiple sets of C/A signal lines to control different DRAMs on the memory module 300 at the same time. For example, the C/A signal lines 451 is used to receive C/A signal from the MC 106 module operations and to transmit C/A signals to the DRAM 310 during backup/restore operations. When both BufA and BufB are provided in the buffer memory 340, C/A signal lines 452 is used to transmit C/A signals to BufA in the buffer memory 340, and the C/A signal lines 453 is used to transmit C/A signals to BufB in the buffer memory 340, so that BufA and BufB can be involved in different data transfer activities concurrently. In some embodiments, the DRAM interface 450 also provides DQ/DQS signal lines (e.g., 454 and 455) that are coupled to BufA and BufB, respectively, so that the HMC 330 can handle multiple data transfers concurrently. For example, while data is being transferred between BufB and the NVM 320, the HMC 330 can perform error correction on data buffered in BufA. In some embodiments, the DRAM interface further provides DQ/DQS signal lines 456 coupled to the DRAM subsystem 310, and may include a separate DQS input 457 for drift adjustment, as discussed in further detail below.

In certain embodiments, the HybriDIMM 300 can be operated to back up data in the DRAM in response to power failure events. The HMC 330 provides correct timings for DRAM 310 to be operated in an DLL-off mode when data in the DRAM is being transferred to the NVM 320. The HMC 330 also provides proper operational procedure for the back-up and restore processes. The switching circuit, FET-A, can be configured to isolate the RCD 320 and to allow the RCD 320 to receive C/A signals from the HMC 330 during the back-up and restore processes. The HMC 330 also controls the switch FET-A to route data from the DRAM 310 to the HMC 330 during backup operations and to route data from the HMC 330 to the DRAM 310 during restore operations.

In certain embodiments, the the system can access the HybriDIMM 300 via the SM bus. For example, the system can use the SM bus to configure the HMC 330 by setting certain registers in the HMC 330. The HMC 330 can also use the SM bus to notify the system when certain operation is completed or when an error is encountered, either using a preconfigured interrupt signal, or by updating a predefined status register in the system bus interface of the HMC 330, or in the DMA.

In certain embodiments, the HMC 330 also manages network interfaces between the HybriDIMM 300 and any local or wide-area networks in conjunction with NIC so as to facilitate direct data transfers between the HybriDIMM 300 and other storage devices in the local or wide-area networks. In certain embodiments, the HMC 330 includes a network interface and/or is coupled to a network interface card (NIC), which can take the data from the DRAM 310 and/or NVM 320, and constructs network packets with proper source and destination addresses. In general, the source address is pre-configured by the system. In certain embodiments, the NIC or network interface and some or all of the other components of the HMC 330 can be embedded into a same ASIC or FPGA.

In some embodiments, the HMC 330 is configurable to control data buffers in the DRAM 310 and includes a data buffer control interface 485 for outputting data buffer control signals via data buffer control signal lines 486.

Figure 5A:
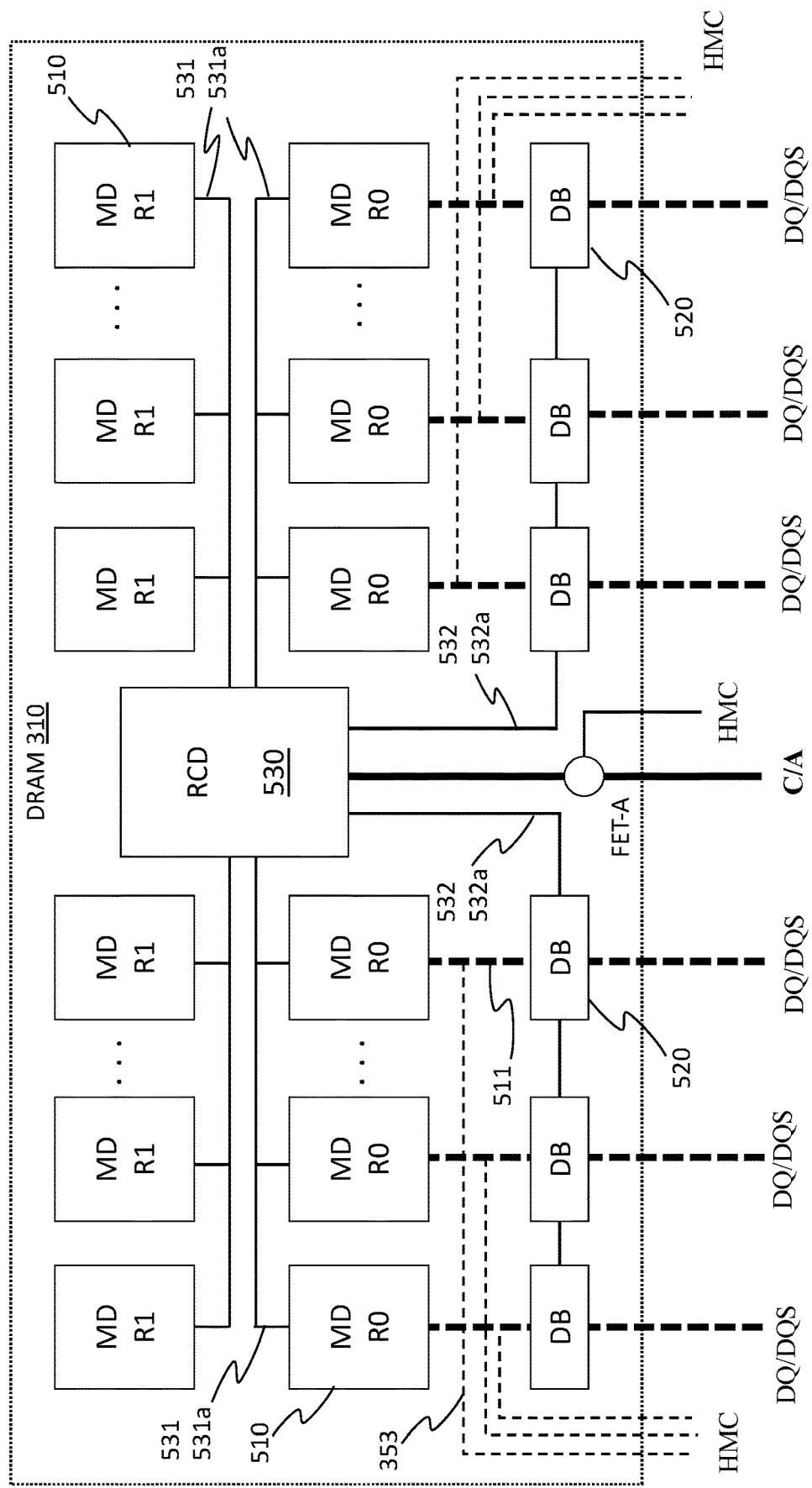
FIG. 5A is a schematic diagram of a volatile memory subsystem in a memory module according to some embodiments.

FIG. 5A is a block diagram of DRAM 310 according to some embodiments. As shown, DRAM 310 includes memory devices (e.g., double data rate dynamic random access memory devices or DDR DRAM) 510 arranged in one or more ranks (e.g., ranks R0 and R1), data buffers (DB) 520 configurable to buffer data signals between the memory devices 510 and the data bus 312, and a register control device (RCD) 530 configured to receive system memory commands represented by a set of system control/address (C/A) signals from the MC via C/A signal lines and generates registered C/A signals 531 and data buffer control signals 532 based on the C/A signals from the system. The RCD 530 also received a system clock and generates a module clock signal or registered clock signal CK in response to the system clock signal.

Examples of the system C/A signals include, but are not limited to, Chip Select (or /CS) signal, which is used to select a rank of memory devices to be accessed during a memory (read or write) operation; Row Address Strobe (or /RAS) signal, which is used mostly to latch a row address and to initiate a memory cycle; Column Address Strove (or /CAS) signal, which is used mostly to latch a column address and to initiate a read or write operation; address signals, including bank address signals and row/column address signals, which are used to select a memory location on a memory device or chip; Write Enable (or /WE) signal, which is used to specify a read operation or a write operation, Output Enable (or /OE) signal, which is used to output of data during a read operation, and the system clock signal MCK.

Examples of registered C/A signals include, but are not limited to registered /CS signals, which can be derived from the system /CS signals and one or more other system C/A signals, such as one or more bank address signals and/or one or more row/column address signals; a registered /RAS signal, which can be, for example, a registered version of the system /RAS signal; a registered /CAS signal, which can be, for example, a registered version of the system /CAS signal; registered address signals, which can be, for example, registered versions of some or all of the address signals; a registered /WE signal, which can be, for example, a registered version of the system /WE signal; a registered /OE signal, which can be, for example a registered version of the system /OE signal. In certain embodiments, the registered clock signal CK is provided together with the registered C/A signals.

The data buffer control signals 532 can be used to convey a variety of commands from the RCD 530 and/or the HMC to the data buffers (DB) 520, including commands for system memory write operations (DRAM-WR), system initiated non-volatile (NV) (e.g., FLASH) write operations, intra-module data transfers from NVM to DRAM (DDx WR), system memory read operation (DRAM-RD), system initiated NVM read operation (SDxRD), and intra-module data transfers from DRAM to NVM (DDxRD) operations. In some embodiments, the data buffer control signals 532 may include one or more sets of BCOM signals for write operations, no operation (No-op), and various training operations, etc, as specified in the JEDEC DDR4 LRDIMM Standard, as defined in DDR4 REGISTER CLOCK DRIVER (DDR4RCD02), JESD82-31A, published in August, 2019, and DDR4 DATA BUFFER DEFINITION (DDR4DB02), JESD82-32A, published in August, 2019, each of which is incorporated herein by reference in its entirety. In some embodiments, some or all of the data buffer control signals can be provided by the HMC 330, as discussed below.

The RCD transmits the registered C/A signals 531 to the memory devices (MD) arranged in one or more ranks (e.g., R0 and R1) via registered C/A signal lines 531a. The memory devices 112 operate in response to the registered C/A signals to receive write data or output read data. The RCD transmits the data buffer control signals 532 to the data buffers (DB) via DB control signal lines 532a. As shown in FIG. 5A, at least some of the memory devices (MD) 510 in a same rank share a same set of registered C/A signal lines 531a, and at least some of the data buffers (DB) share a same set of DB control signal lines 532a.

Figure 5B:
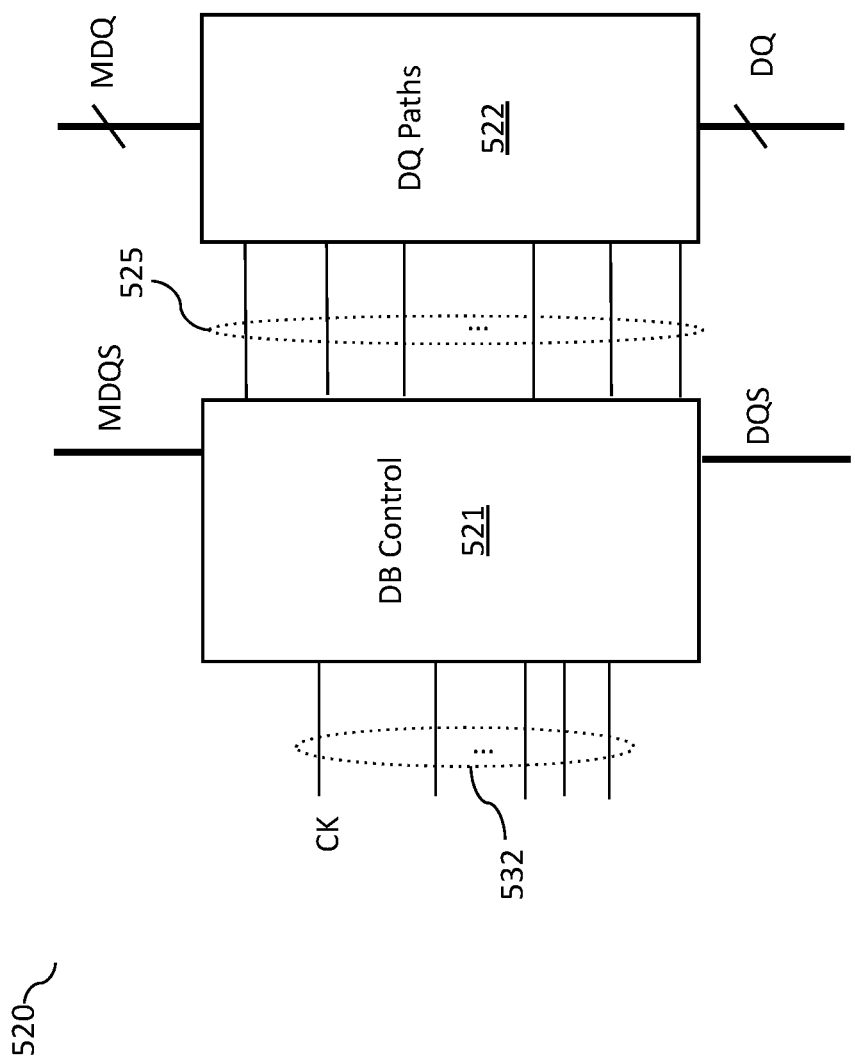
FIG. 5B is a schematic diagram of a data buffer in a memory module according to some embodiments.

In some embodiments, the data buffers (DB) 520 are coupled between respective groups of system data/strobe (DQ/DQS) signal lines in a respective segment or section of the data bus 312 and respective memory data/strobe (MDQ/MDQS) signal lines 511 on the memory module. The data buffers (DB) are configured to buffer data/strobe signals between data input/output (I/O) of a respective section of the memory devices (MD) 510 and the respective data/strobe (DQ/DQS) signal lines in the data bus 312 in response to the data buffer control signals 532. Each section of the memory devices 510 includes one or more memory devices 510 in each rank of the one or more ranks. In some embodiments, as also shown in FIG. 5A, the HMC is coupled to the data I/O of the memory devices (MD) 510, and is configurable to communicate data/strobe signals with the memory devices (MD) 510 and the data buffers (DB) 520. In some embodiments, as shown in FIG. 5B, each DB includes DB control circuitry 521 and a data (DQ) path 522. The DB control circuitry 521 is configurable to control the DQ paths 522 by outputting a set of control signals 525 in response to the a set of DB control signals 532 received from the RCD 530 and/or the HMC 330, as discussed in further detail below. Each data buffer (DB) can include, for example, one or more JEDEC DDR4 LRDIMM data buffers (e.g., the data buffer specified in DDR4 DATA BUFFER DEFINITION (DDR4DB02), JESD82-32A, August 2019).

Figure 6:
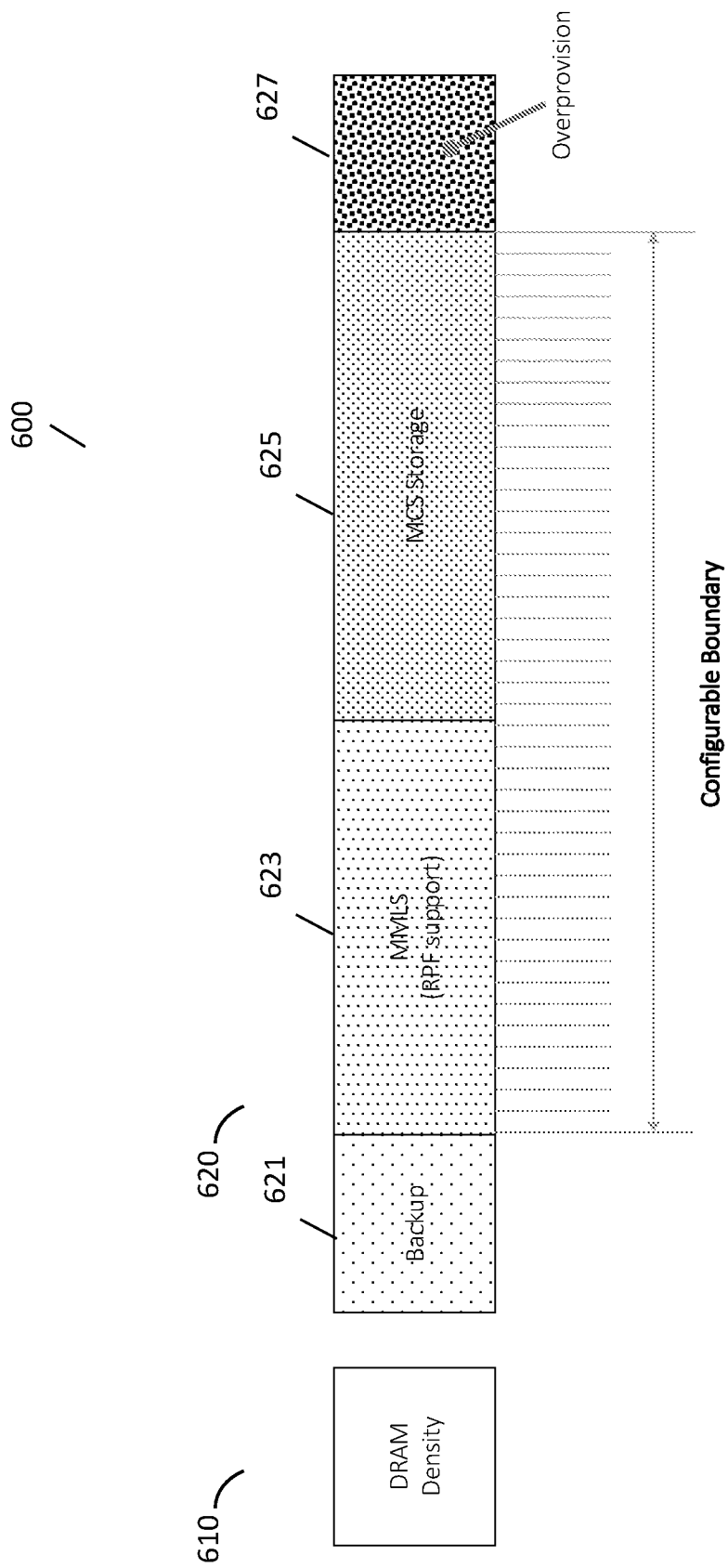
FIG. 6 is an illustration of a physical memory address space of a memory module according to certain embodiments.

FIG. 6 illustrates a memory space 600 provided by the HybriDIMM 300 according to certain embodiments. As shown in FIG. 6, the memory space 600 includes a DRAM space 610 and a NVM space 620. The NVM space 620 is partitioned into a plurality of areas, including a non-volatile (NV) backup area 621, a main memory local storage (MMLS) area 623, a MCS Storage area 625, etc. each of which can be used to support a different function of the hybrid memory. For example, the NV backup area can be used to store a copy of the content in the DRAM during power outage; and the MMLS area can be used as a swap space, and/or to function as part or all of the main memory. In certain embodiments, working data for random access by the system is stored in DRAM data format in the MMLS area. The MCS area can be used as traditional non-volatile storage. In certain embodiments, the memory space in the NVM 320 also includes an overprovision area, which provides extra storage capacity. In certain embodiments, the overprovision area is hidden from the system and is used to improve performance by distributing writes and erases across a larger population.

The DRAM space 610 includes the physical memory space for random access by the system. This space can be shared by multiple processes or applications running on the system 100. In order to manage the memory space 610 efficiently, the system 100 may provide an abstraction of its main memory known as virtual memory or virtual address space, which maps memory addresses used by a program (i.e., virtual addresses, into physical addresses in the DRAM 310. To implement virtual memory, the system 100 may include a memory management unit (MMU) that keeps track of the pages and their address translations. When a running program tries to access data in a memory page that is mapped into the virtual address space of the system, but not loaded in the physical memory provided by the DRAM 310, a page fault occurs, and the system may raise an interrupt, which prompts the HybriDIMM driver 250 to handle the page fault by causing the memory module 300 to move the requested data from the NVM 320 to the DRAM 310, so as to allow the program to continue operation as if the page fault had not occurred.

In certain embodiments, for operations involving the NVM 320 or buffer memory 340, such as a swap-in or swap-out operation, the HybriDIMM driver 250 sends a NVM access request to the memory controller when it needs to transfer data between DRAM (main memory) and NVM (storage) and provides the DRAM and the NVM addresses with this request. Afterwards, the HybriDIMM driver 250 and the HMC 330 work together to move data in or out of the DRAM 310 without causing conflict with normal system accesses to the main memory. In certain embodiments, the memory controller may interleave the storage accesses with normal system memory accesses.

Figure 7:
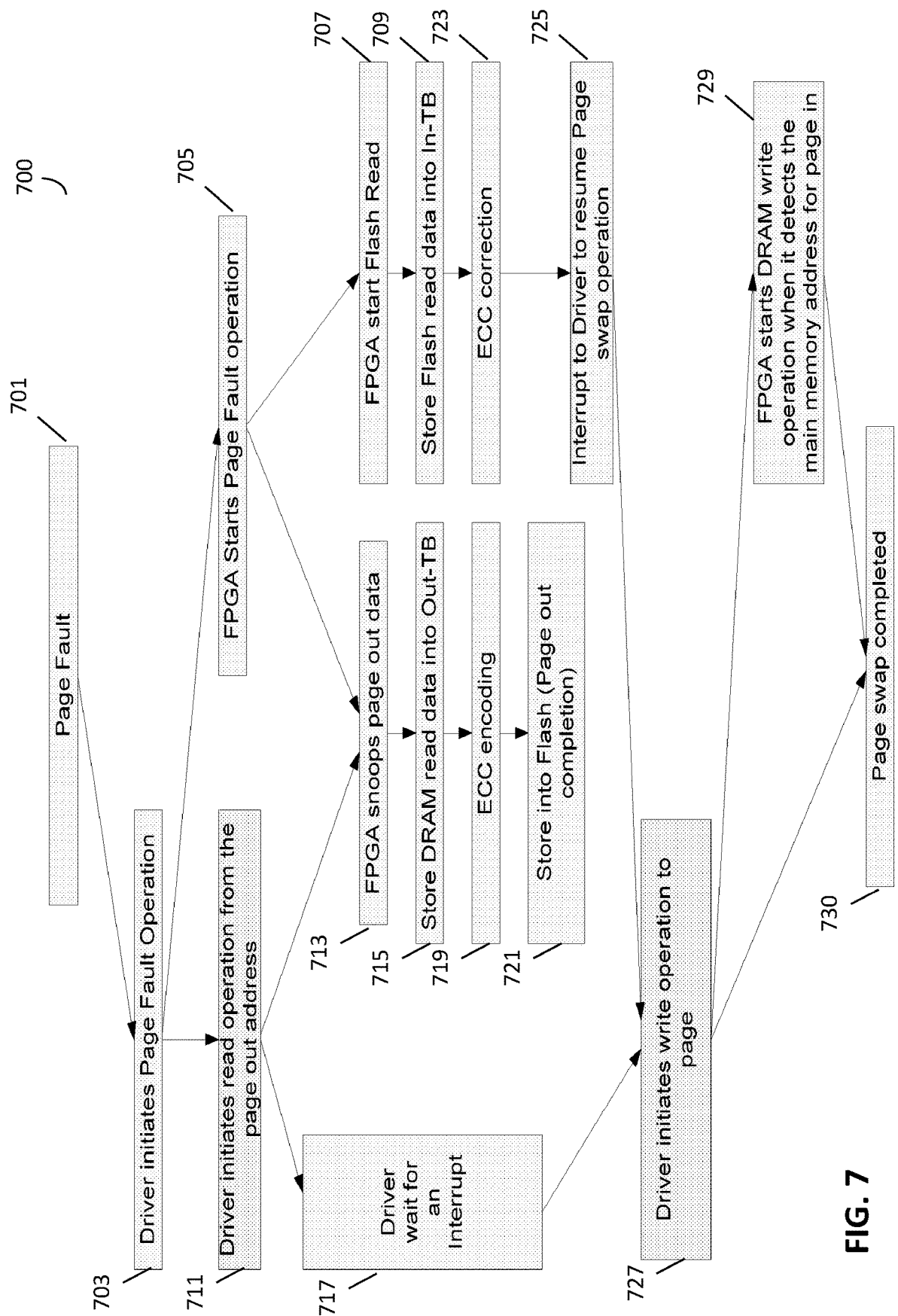
FIG. 7 is a flowchart of data transfers in response to a page fault in the computer or server system according to certain embodiments.
Figure 8:
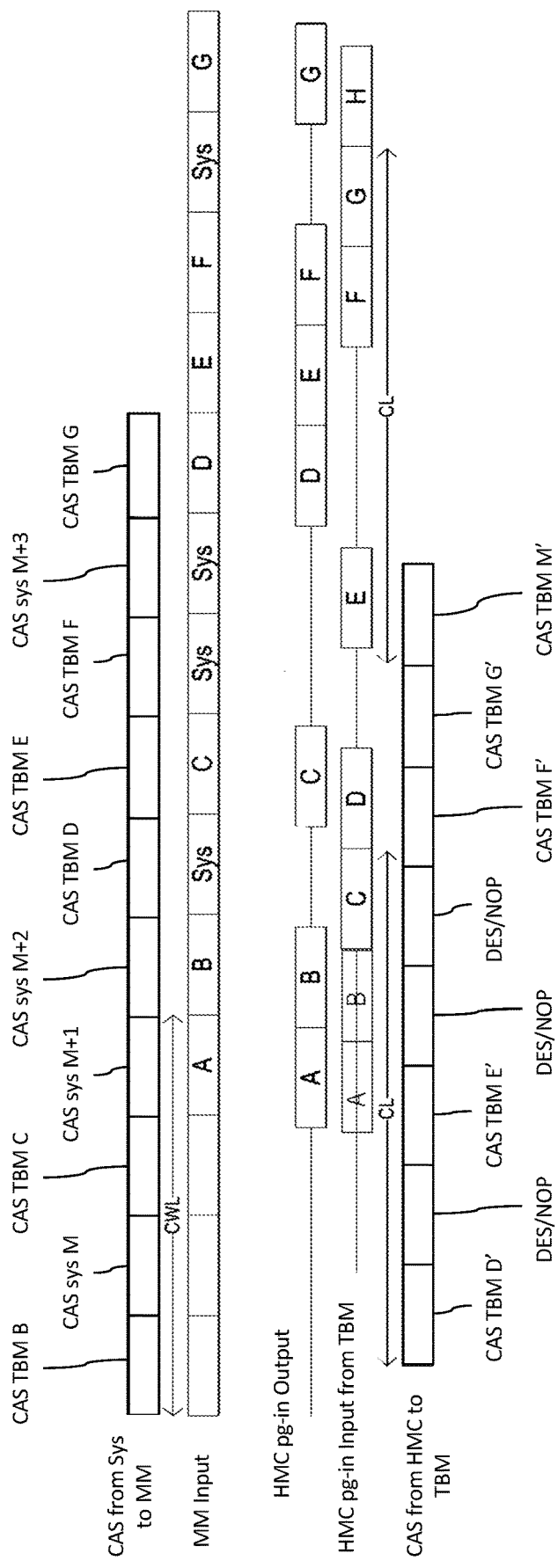
FIG. 8 is a timing diagram illustrating interleaving of page-in data flow with normal memory accesses to avoid data access conflicts according to certain embodiments.

For example, FIG. 7 illustrates a process 700 carried out by the HybriDIMM driver 250 and the HMC 330 in response to a page fault 701 according to some embodiments. As shown in FIG. 7, the HybriDIMM driver 250 initiates a page-fault operation (703) by causing the memory controller to send a first set of C/A signals via the C/A bus to the HybriDIMM 300 and a first set of data signals associated with the first set of C/A signals via the data bus to the HybriDIMM 300. In certain embodiment, the first set of C/A signals includes a write command that is not directed at the DRAM 310. For example, the C/A signals may include one or more chip select signals, none of which is asserted to select any of the ranks in the DRAM 310. The first set of data signals include further information for the page fault operation such as one or more address locations in the NVM (e.g., Flash memory or Flash) where the requested data is to be retrieved. The HMC 330 recognizes the first set of C/A signals and starts the page fault operation on the DIMM (705) snoops the first data signal as they travel from the data buffers DB to the DRAMs. The HMC 330 then starts NVM reads (707) by generating NVM C/A signals based on the first set of C/A signals and based on the first data signal received from the memory controller, causing the NVM to output page-in data that is to be loaded in DRAM. The HMC 330 can cause the page-in data to be stored in BufA (709), as shown in FIG. 8, and sends a set of C/A signals to BufA ahead of the page-in data according to the timing requirements of the memory devices in BufA.

Concurrently, the HybriDIMM driver 250 continues to handle the page fault operation. The HybriDIMM driver 250 may swap some data out of the DRAM 310 to make space for the memory page that is to be loaded in DRAM. In certain embodiments, the HybriDIMM driver 250 does this by causing the memory controller to send a second set of C/A signals including a read command and a read address (711), which causes the DRAM to output page-out data. The second set of C/A signals are received by both the RCD and the HMC 330. The HMC 330 recognizes the second set of C/A signals as being part of the page fault operation because the read address is related to the address in the first set of C/A signals. In response, the HMC 330 snoops the page-out data (713) and causes the page-out data to be written into BufB (715) by sending a set of C/A signals and afterwards the page-out data to BufB according to the timing requirements of the memory devices in BufB.

The HybriDIMM driver 250 now waits (717) as the HybriDIMM 300 continues the data transfers discussed above. In certain embodiments, the HMC 330 may add error correction codes (ECC) to the page-out data (719), as discussed in U.S. patent application Ser. No. 14/536,588, filed Nov. 7, 2014, entitled "Hybrid Memory Module and System and Method of Operating the Same," which is incorporated herein by reference. In certain embodiments, ECC coding is done as the page-out data is being transferred to the NVM 320 through the HMC 330. The HMC 330 also sends NVM C/A signals to cause the ECC encoded page-out data to be stored in the NVM (721). In certain embodiments, the HMC 330 manages NVM 320 addresses and keeps track of physical NVM addresses in relation to virtual/physical addresses known to the system. This can be done by creating and updating an address-mapping table, which maps the system (virtual/physical) addresses to the NVM physical addresses. HMC 330 uses the address-mapping table to correctly place page-out data into proper locations in NVM 320.

The HMC 330 may perform error correction on the page-in data read out from the NVM (723), as discussed in U.S. patent application Ser. No. 14/536,588, filed Nov. 7, 2014, entitled "Hybrid Memory Module and System and Method of Operating the Same," which is incorporated herein by reference. In certain embodiments, the HMC 330 does so by reading the page-in data stored in BufA, performing error detection and correction on the page-in data, and storing the corrected page-in data back into BufA. Depending on the size of the page-in data, the HMC 330 may separate the page-in data into portions and performs error correction on the page-in data one portion at a time by reading out each portion of the page-in data, performing error detection and correction on the each portion, and writing the corrected portion back into BufA before reading out the next portion of the page-in data for error correction.

While the HybriDIMM 300 is preparing for the page-in data, as described above, the HybriDIMM 330 can perform normal main memory operations in response to commands from the system. When the HMC 330 completes the data transfers and error corrections discussed above, the HMC 330 may send (725) an interrupt to the HybriDIMM driver 250 via, for example, the SM bus. In response, the HybriDIMM driver initiates a dummy write operation by causing the memory controller to send a third set of C/A signals including a write command and a write address to the HybriDIMM 300. In certain embodiments, the dummy write command is like a normal write command except that it is followed with dummy data or no data from the memory controller. The third set of C/A signals are received by both the RCD and the HMC 330. The HMC 330 recognizes the third set of C/A signals as being part of the page fault operation because the read address is related to the address in the first or second set of C/A signals. In response, the HMC 330 sends a read command to BufA, which causes BufA to output the page-in data. The HMC 330 then provides the page-in data to the DRAM 310 in time for the DRAM 310 to receive the page-in data in response to the registered C/A signals from the RCD, which are derived from the third set of C/A signals. The dummy data from the memory controller is thus ignored or discarded.

In certain embodiments, normal system access to the main memory is conducted between the system and the DRAM 310, without much involvement from the HybriDIMM driver 350 or the HMC 330. In certain embodiments, the memory interfaces in the computer system 100 are designed to be slave interfaces without per command handshake provision. So, the system does not have knowledge about whether any on-DIMM (intra-module) activities are occupying the DRAM input/output (I/O) pins in the DRAM 310. For example, if the DRAM I/Os are being occupied for transferring data between main memory and storage, and the system (memory controller) initiates a data read or write command with the expectation that the DRAMs would be ready to execute the system command, the DRAMs would fail to execute the system read/write operation and the system would experience a 'memory failure', which may lead to a system failure.

In certain embodiments, the HMC 330 reads the page-in data from BufA and then provides the page-in data from the HMC 330 to the DRAM 310 in response to the dummy write command from the system. The HMC is configured to monitor the memory commands from the memory controller and schedule on-DIMM (intra-module) data transfers accordingly to avoid data access conflicts. In certain embodiments, the HMC 330 would work around system memory accesses when placing the page-in data at the DRAM I/Os, so as to avoid system failure caused by such data access conflicts. For example, as illustrated in FIG. 8, as data A through G are being paged in from the buffer memory 340 (TBM) to the main memory (MM), the system may also be issuing memory access commands to write data M, M+1, M+2, M+3 into the main memory (MM). The memory controller may schedule the memory commands from the system and the dummy write commands from the HybriDIMM driver 350 as follows:

CAS TBM A (not shown)—which is a dummy write command from the HybriDIMM driver 350 to transfer data A from TBM to main memory (MM);

CAS TBM B—which is a dummy write command from the HybriDIMM driver 350 to transfer data B from TBM to main memory (MM);

CAS sys M—which is a normal write command to write data M from system into MM;

CAS TBM C—which is a dummy write command from the HybriDIMM driver 350 to transfer data C from TBM to main memory (MM);

CAS sys M+1—which is a normal write command to write data M+1 from system into MM;

CAS sys M+2—which is a normal write command to write data M+2 from system into MM;

CAS TBM D—which is a dummy write command from the HybriDIMM driver 350 to transfer data C from TBM to main memory (MM);

CAS TBM E—which is a dummy write command from the HybriDIMM driver 350 to transfer data C from TBM to main memory (MM);

CAS TBM G—which is a dummy write command from the HybriDIMM driver 350 to transfer data C from TBM to main memory (MM);

CAS sys M+3—which is a normal write command to write data M+3 from system into MM; and CAS TBM H (not shown)—which is a dummy write command from the HybriDIMM driver 350 to transfer data H from TBM to main memory (MM).

Before the system issues the CAS TBM B command, the HMC 330 (referred to in the figure as "FPGA") may have issued CAS TBM A', CAS TBM B', and CAS TBM C' commands to BufA to output data A, data B, and data C to the HMC 330. The HMC may preload data A and data B from the TBM (as shown by the data blocks A and B in the "FPGA pg-in input from TBM") and place it in the data buffer 420 in the HMC. Afterwards, data C is output from the TBM in response to CAS TBM C' from the HMC.

The HMC continues to issue CAS TBM D' to the TBM when the HMC observed the CAS sys M command from the system. In response, the HMC issues a DES/NOP command to the TBM to pause the data transfer between the TBM and the MM. Thus, FPGA page-in (Pg-in) output is paused, as shown by the gap between data B and data C in the FPGA Pg-in output, and system data M (Sys) is received at the MM input. Afterwards, the HMC continues to issue CAS TBM E' to the TBM when it observed CAS sys M+1 and later CAS sys M+2 from the system. In response, the HMC issues two consecutive DES/NOP commands to pause the TBM from outputting data to the HMC. As a result, no data is output between data E and data F from the TBM, and no data between data C and data D is driven from the HMC to the MM, leaving a gap in the HMC output to the MM to allow the MM to take system data M+1 and M+2 (Sys).

In certain embodiments, the HMC 330 is further configurable to perform shadowed data transfer operations between the DRAM 310 and the NVM 320. For example, when a system command targets a DRAM address that has been preprogrammed as an address that requires data to be transferred from the NVM 320, the HMC 330 would perform such a transfer to enable proper system access to this preprogrammed address.

Figure 9A:
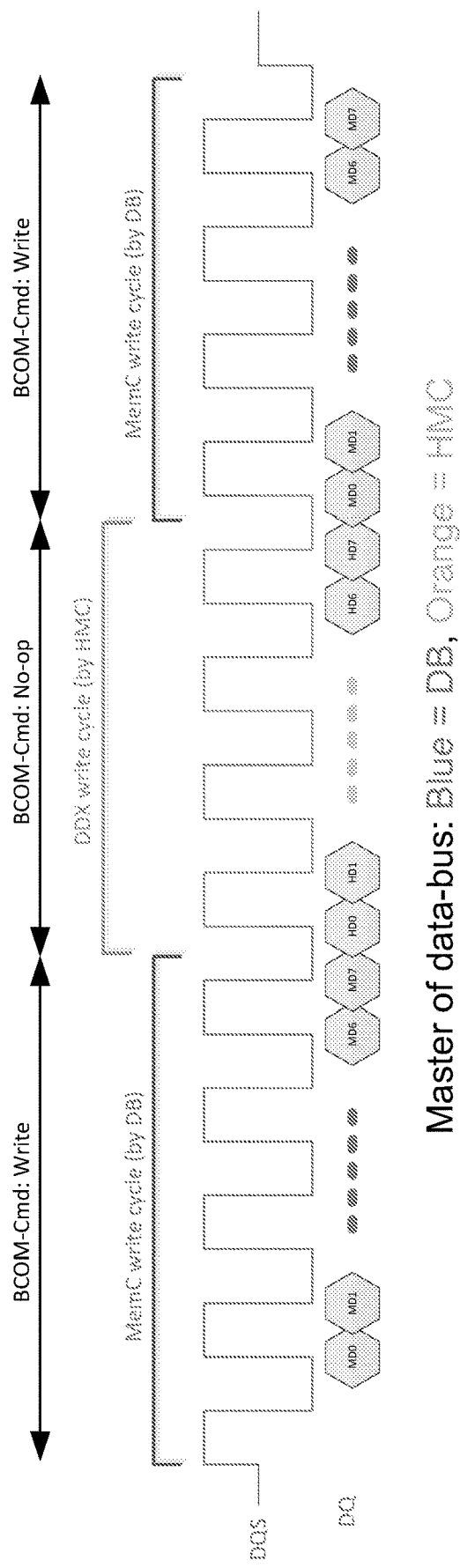
FIG. 9A is a timing diagram of an ideal operation of successive write cycles in a memory module according to some embodiments.

In some embodiments, in response to a system memory write command, the RCD outputs BCOM signals representing a Write command to the data buffers (DB), and in response to a dummy write memory command, the RCD outputs BCOM signals representing a No-op command to the data buffers (DB). FIG. 9A is a timing diagram of an ideal operation of successive HybriDIMM write cycles, e.g., memory controller (MemC) write cycle (through DB) in response to the CAS sys M command, intra-module data transfer (DDX) write cycle (by HMC) in response to the CAS TBM C command, and MemC write cycle (through DB) in response to the CAS sys M+1 command. Ideally, these write operations should be continuously chained back-to-back at the memory device I/Os. For an example, FIG. 9A shows write-cycles to memory device I/Os with continuous DRAM-WR & DDxWR & DRAM-WR data/strobe cycles.

Figure 9B:
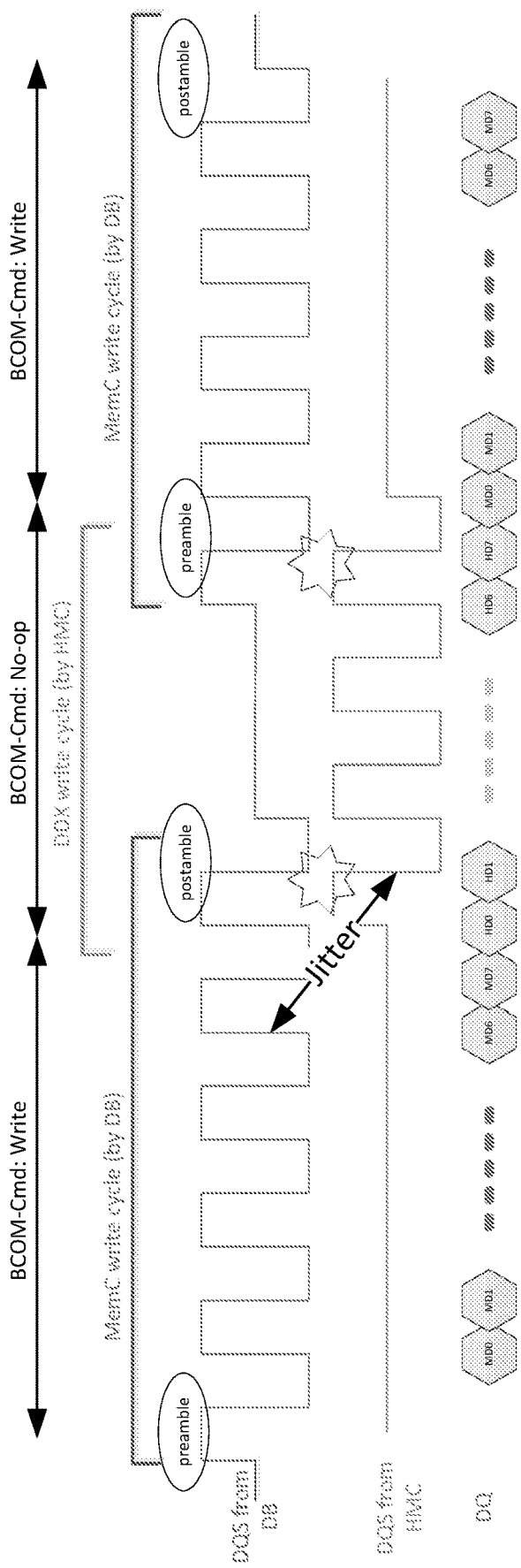
FIG. 9B illustrates issues associated with various data transfers in a memory module according to some embodiments.

FIG. 9B illustrates issues associated with using various data transfers in the HybriDIMM module 300. As shown, during transition from the MemC write cycle to the DDX write cycle, there is DQS contention at the DRAM I/Os between the postamble of the DQS signal for the MemC write cycle and the preamble of the DQS for the DDX write cycle if the DQS signal for the MemC write cycle is from the data buffer and the DQS signal for the DDX write cycle is from the HMC. In practice, DQS output from DB can be driven as much as one-clock period for preamble and postamble. And this causes DQS signal contention at the DRAM I/Os. Also, because of the two different sources of DQS (DB & HMC), jitter may occur when switching the DQS sources.

TABLE I

| Module Operations | DB Command | Source of DQ/DQS Signals | |
|---|---|---|---|
| | | DQ | DQS |
| DRAM-WR SDxWR | Sys_WR | DB | DB |
| DDxWR | DDxWR | HMC | DB |
| DRAM-RD DDxRD | RD | DRAM | HMC |
| SDxRD | RD | HMC | HMC |
| No-op | No-op | | |
| Back-up | No-op | DRAM | HMC |
| Restore | No-op | HMC | HMC |

Figure 10A:
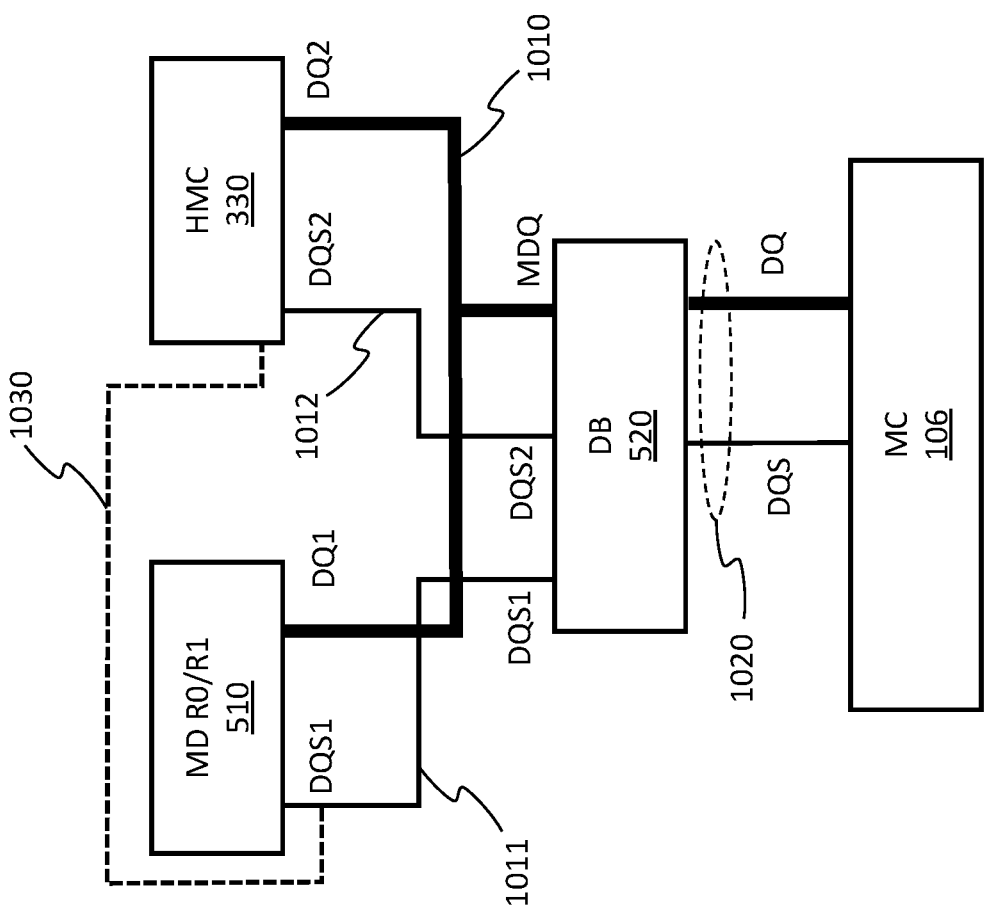
FIG. 10A is a schematic diagram showing a portion of a memory module including a data buffer coupled to data/strobe signal lines in a segment of a data bus and to module data lines and module strobe signal lines, according to some embodiments.

FIG. 10A is a block diagram showing a portion of the HybriDIMM 300 including a data buffer 520 coupled to DQ/DQS signal lines in a segment 1020 of the data bus 312 and to module data lines 1010 and module DQS signal lines 1011 and 1012, according to some embodiments. As shown in FIG. 10A, to avoid the aforementioned DQS contention at the DRAM I/Os, the data buffer (DB) 520 is coupled to one or more memory devices 510 via DQS signal line(s) 1011, which conduct a first set of module DQS signal(s) DQS1, and to the HMC via DQS signal line(s) 1012, which conduct a second set of module DQS signal(s) DQS2. This design of the DB 520 allows the source of the DQS signals that are used to sample read or write data to be the same for different types of read or write operations, as illustrated in Table I.

For example, as shown in Table I, various module operations affect signal paths shown in FIG. 10A in various ways. For example, during a DRAM-WR or SDxWR operation, in response to DB control signals indicating a Sys-WR command, the data buffer 520 drives data on MDQ and strobes on DQS1 and DQS2, allowing both the memory device 510 and the HMC 330 to receive host data in a host-initiated memory write operation. As another example, during a DDxWR operation, in response to DB control signals indicating a DDxWR command, the HMC 330 drives data on DQ2 and the data buffer 520 drives strobes on DQS1, allowing the HMC 330 to transfer data to the Memory Device 510 in a host-initiated memory write operation. In some embodiments, each of the data buffers (DB) provides two DQS paths corresponding, respectively, to the two sets of DQS signal line(s) 1011 and 1012, and is configured to allow independent control of the DQ path and at least one of the DQS paths (e.g., DQS1), so that, during write cycles for intra-module data transfers, the data paths in the data buffers (DB) can be turned off, while one of the DQS paths is turned on to output DQS1 signals after buffering DQS signals from the memory controller (MC) 106. The HMC 330 is configured to output data for intra-module data transfers to align with the DQS1 signals. In some embodiments, the data buffers and the HMC are configured such that, for write operations (DRAM-WR, DDxWR, SDxWR), the data buffers (DB) drive the DQS1 signal(s) after receiving the DQS signal(s) from the memory controller (MC or MemC). In some embodiments, DQS1 from the data buffer 520 is optionally input to the HMC 330 during write operations for drift alignment, as indicated by the dashed line 1030. For system initiated non-volatile (NV) (e.g., Flash) write operations (SDxWR), the HMC 330 receives the DQS2 signals from the data buffers 520 together with the MDQ data signals.

For read operations, including system memory read operation (DRAM-RD), intra-module transfer read operation (DDxRD), system initiated NVM read operation (SDxRD), HMC drives the DQS2 signals via DQS signal lines 1012, which is buffered by the data buffer 520 and output or regenerated as the DQS signal(s) to the MC 106, together with the DQ signal(s), in response to DB control signals indicating an RD command. Thus, the DQS signals accompanying the DQ signals on the data bus 1020 during system memory read operation (DRAM-RD) originate from the HMC 330 instead of the memory devices 320. Because there's no source-switching on DQS as shown before in FIG. 9B, there's no bus contention and no jitter-violation in the HybriDIMM 300.

Figure 10B:
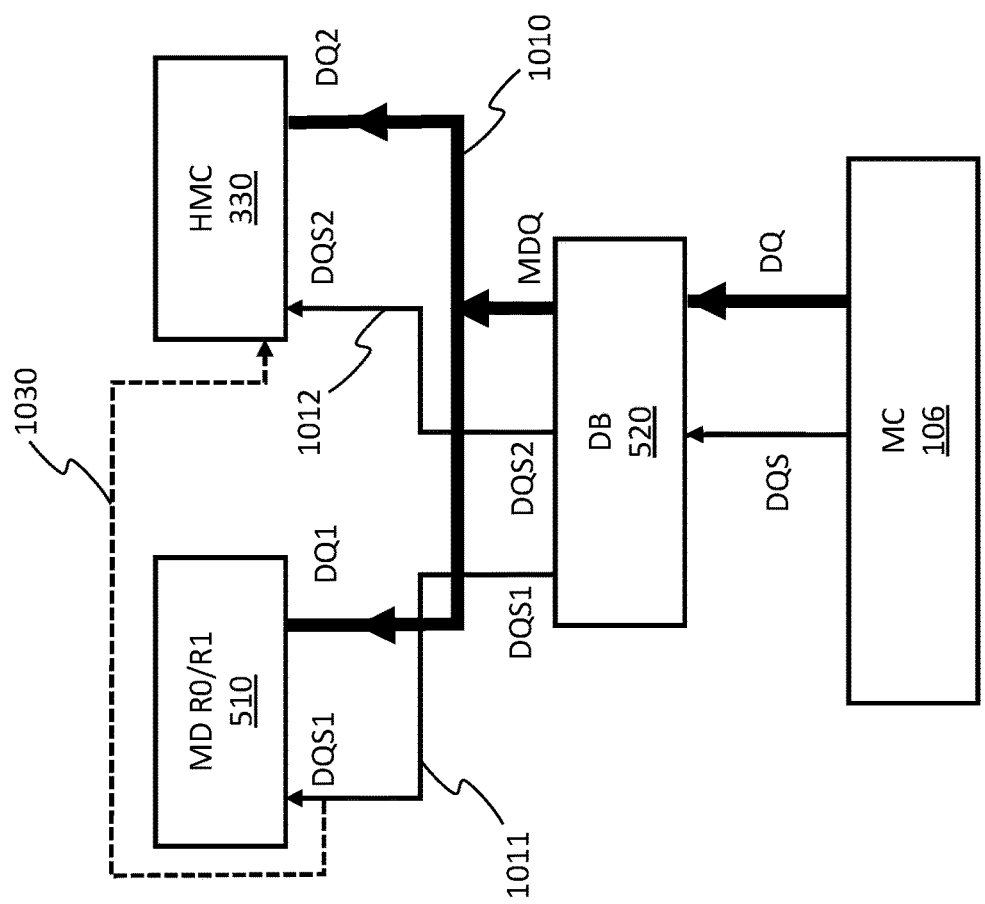
FIG. 10B illustrates system memory write operations (DRAM-WR) and system initiated non-volatile (NV) write operations (SD×WR), according to some embodiments.

FIG. 10B illustrates system memory write operations (DRAM-WR) and system initiated non-volatile (NV) (e.g., Flash) write operations (SD×WR), according to some embodiments. As shown in FIG. 10B, during DRAM-WR, or SD×WR, the DB control signals including the Sys-WR command are driven by the RCD 530 and/or HMC 330 to command the data buffer 520 into DRAM-WR or SD×WR operation. In response, the data buffers (DB) 520 is configurable to receive write data DQ and write strobe DQS from the MC 106 and to output buffered write data MDQ and buffered (or regenerated) write strobes DQS1 (optional during SD×WR) and DQS2 (optional during DRAM-WR). DQS1 is used by MD 510 to receive the buffered write data MDQ during DRAM-WR, and DQS2 is used by HMC to receive the buffered write data MDQ during SD×WR. In some embodiments, DQS1 is optionally provided to the HMC for drift alignment, as indicated by the dashed arrow. In some embodiments, during DRAM-WR and/or SD×WR, the data buffer 520 is configurable to output two sets of DQS signals DQS1 and DQS2 in response receiving respective DQS signals from the MC 106 via respective DQ signal lines in a respective segment 1020 of the data bus 312. DQS1 is output via DQS signal line(s) 1011 to the DRAM I/O of respective memory device(s) 510, and DQS2 is output via DQS signal line(s) 1012 to the HMC. The MDQ/DQS1 signals are ignored by the memory device 510 during the SD×WR and the MDQ/DQS2 signals are ignored by the HMC 530 during DRAM-WR, in accordance with the chip select or device/rank ID signals in the address/control signals from the MC.

Figure 10C:
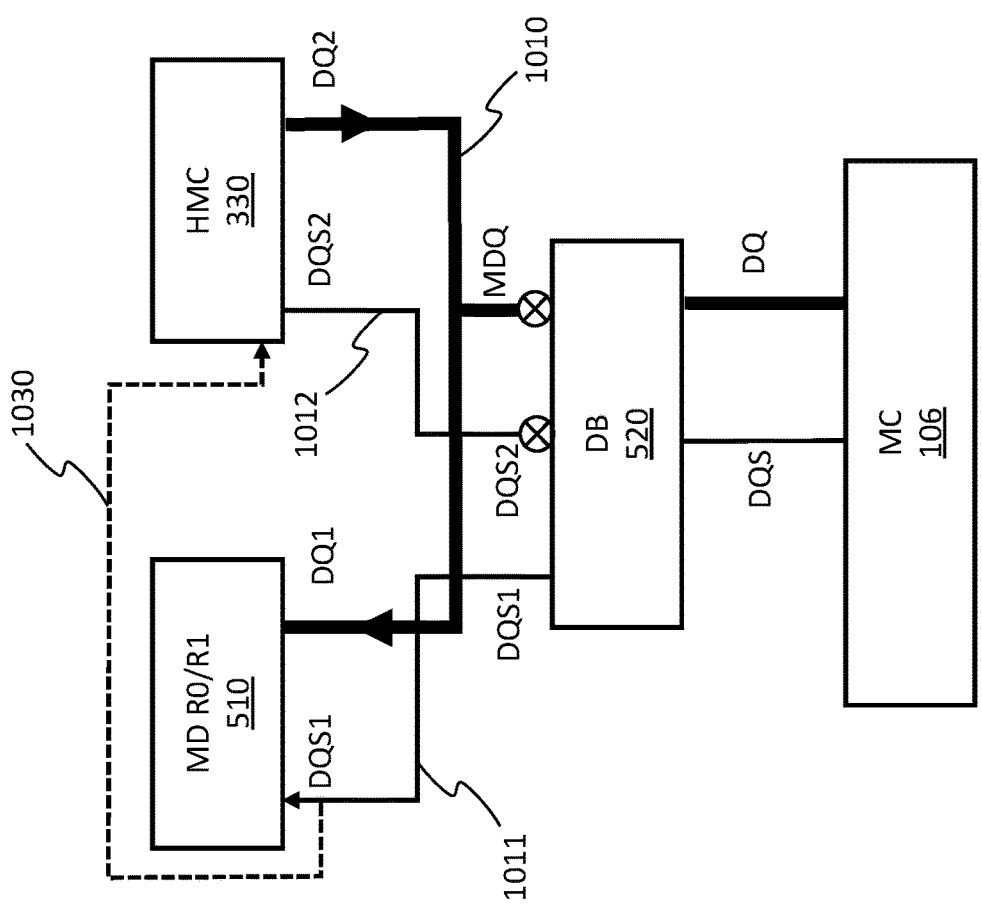
FIG. 10C illustrates DQ and DQS signal paths during intra-module data transfers from NVM to DRAM (DD×WR) according to some embodiments.

FIG. 10C illustrates DQ and DQS signal paths during intra-module data transfers from NVM to DRAM (DD×WR) according to some embodiments. As shown in FIG. 10C, during the DD×WR operations, the DB control signals including the DD×WR command are driven by the RCD 530 and/or HMC 330 to command the data buffer 520 into DD×WR operation. In response, the data buffer 520 is configurable to output the DQS1 signals, which is used by the MD 510 to receive from the HMC data transferred from the NVM 320 via the module data lines 1010. The outputs for DQS2 and MDQ in each data buffer 520 can be disabled to block any signals from the memory controller 106 during DD×WR operations to reduce noise.

Figure 10D:
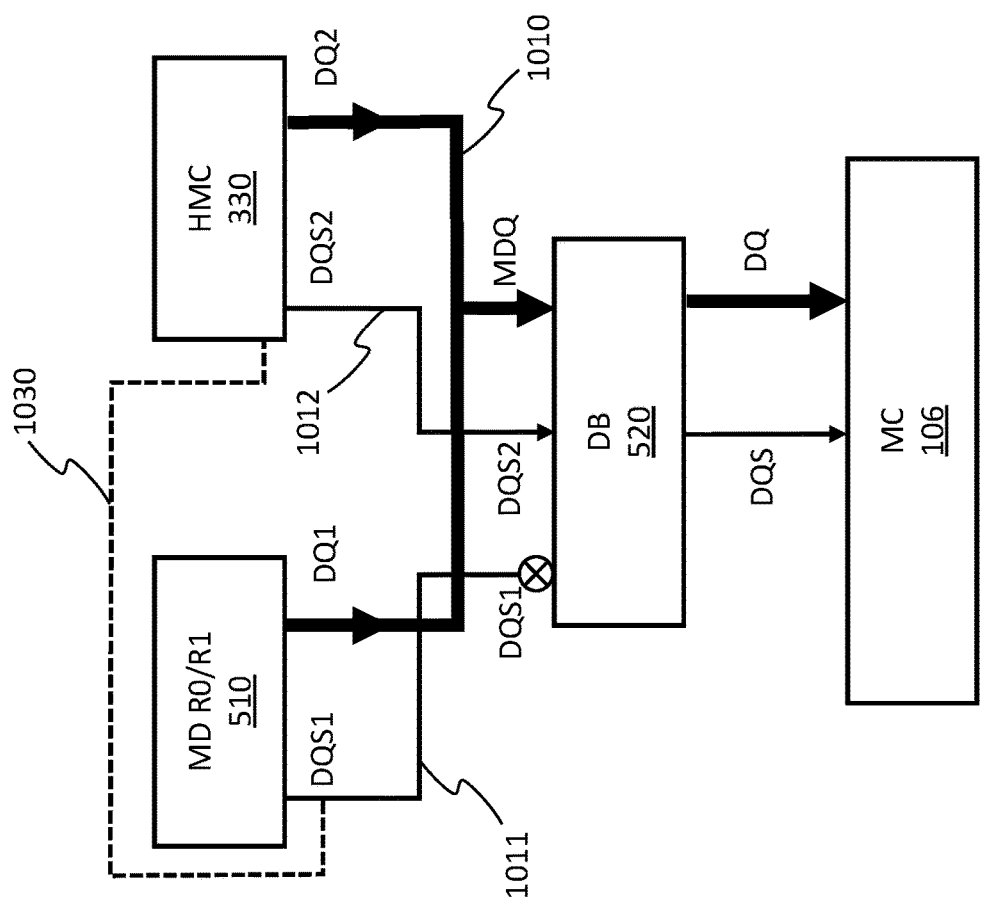
FIG. 10D illustrates system memory read operation (DRAM-RD) and system initiated NV read operation (SD×RD) according to some embodiments.

FIG. 10D illustrates system memory read operation (DRAM-RD) and system initiated NVM read operation (SD×RD) according to some embodiments. As shown in FIG. 10D, during the DRAM-RD or SD×RD or DD×WR operation, the DB control signals including the RD command are driven by the RCD 530 and/or HMC 330 to command the data buffer 520 into DRAM-RD or SD×RD operation. In response, the data buffer (DB) 520 receives strobe signals DQS2 from the HMC 330 and data signals DQ1 from the MD 510 (during the DRAM-RD operations) or DQ2 from the HMC 330 (during the SD×RD operations). The DQS1 signal output by the MD 520 is ignored or blocked by the DB 520. The host manages the timing between DQS2 from HMC 330 and DQ1 from MD 510 through Read Leveling during boot-up-training. Optional DQS1 from MD 510 to HMC 330, as indicated by the dashed arrow line, may be implemented, so that HMC 330 can detect any drift on DRAM output by voltage/temperature, etc. and align them in real-time.

Figure 10E:
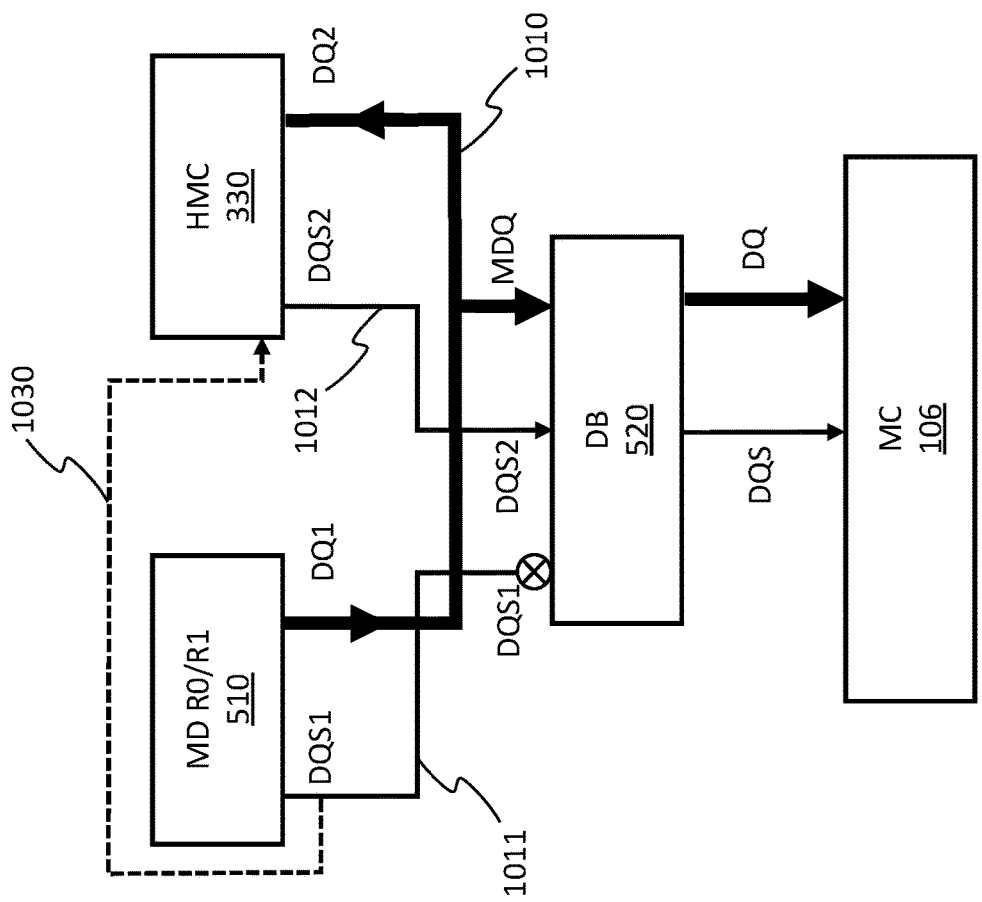
FIG. 10E illustrates DQ and DQS signal paths during intra-module data transfers from DRAM to NVM (DD×RD), according to some embodiments.

FIG. 10E illustrates DQ and DQS signal paths during intra-module data transfers from DRAM to NVM (DD× RD), according to some embodiments. As shown in FIG. 10E, during the DD×RD operation, while DQ1 is driven from the MD 510 to the HMC 330 and the DB 520, DQS2 is driven from HMC 330 to the DB 520. The DB control signals including the RD command are driven by the RC and/or HMC 330 to command the data buffer 520 into DRAM-RD or SD×RD or DD×WR operation. In response, the DB 520 receives the DQS2 and the DQ1 and outputs DQS and DQ. Because the host has initiated this read-cycle via a dummy read memory command, the host expects DQS and DQ from the memory module, even though the host will ignore these DD×RD data. Thus, for DRAM-RD, SD×RD, and DD×RD operations, the source of DQS is HMC.

Figure 11A:
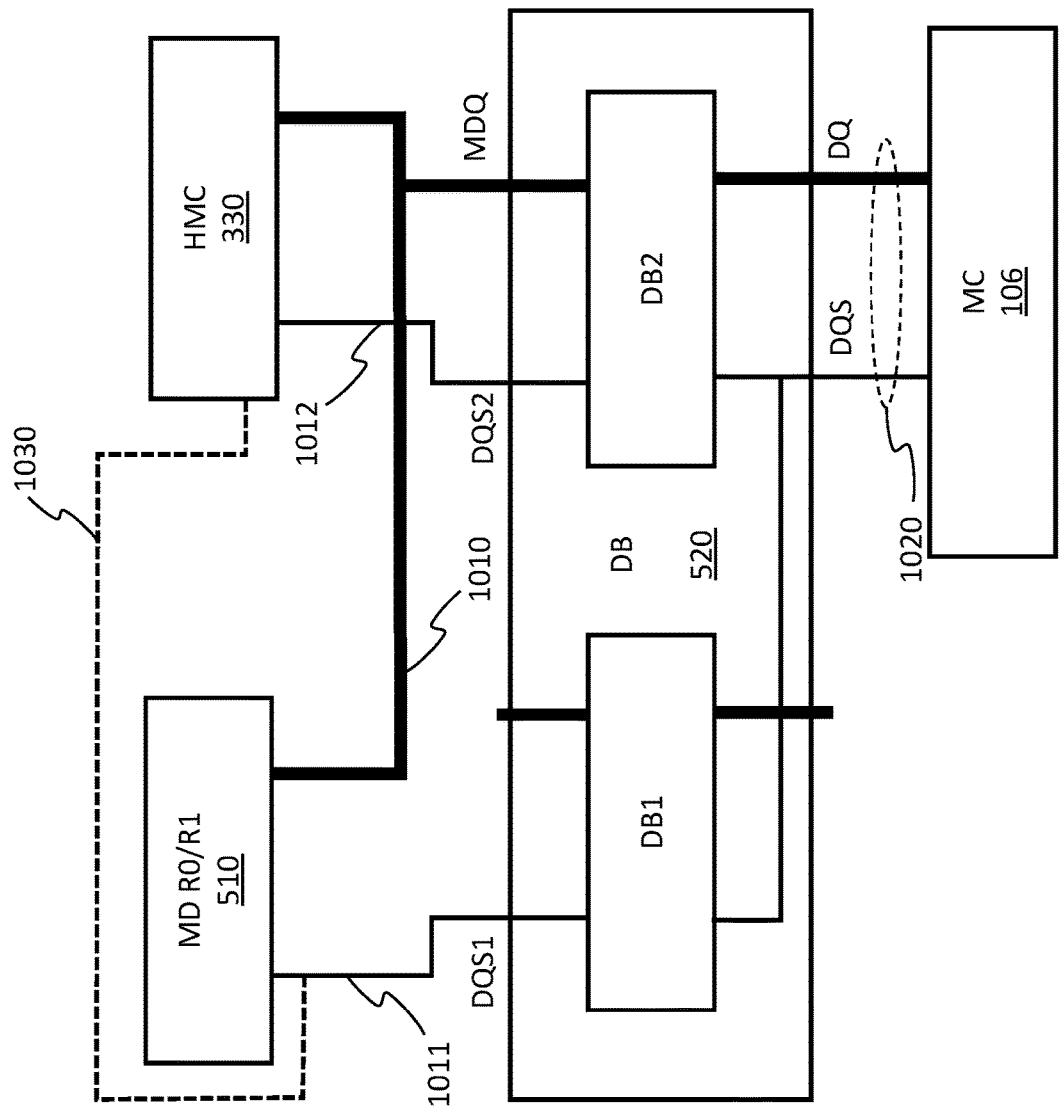
FIG. 11A illustrates dual-buffer implementation of a data buffer in a memory module according to some embodiments.

In some embodiments, as shown in FIG. 11A, each of the data buffers (DB) 520 can be implemented using two data buffers in two integrated circuit chips, e.g., DB1 and DB2, which can be identical. Although each of the two data buffers DB1 and DB2 does not allow independent control of the DQ and DQS paths, the two data buffers can be independently controlled using two sets of BCOM signals to provide independent control of DQ and DQS signal paths through the data buffer (DB) 520.

Figure 11B:
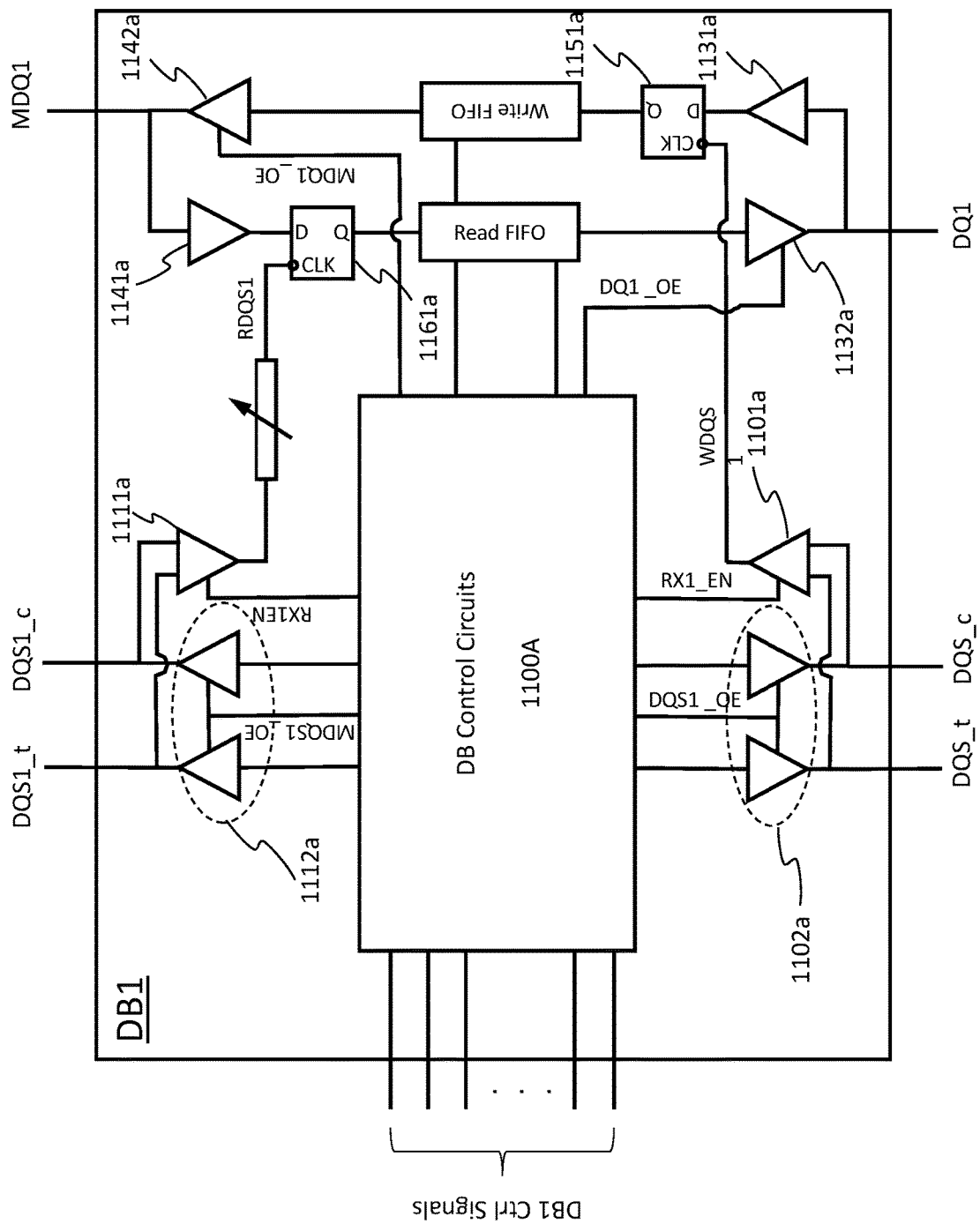
FIGS. 11B and 11C are schematic diagrams of first and second data buffer circuits, respectively, implemented in a data buffer according to some embodiments.

For example, each of the two data buffers DB1 and DB2 can be implemented using a JEDEC DDR4 LRDIMM data buffer, according to some embodiments. As shown in FIG. 11B, which illustrates schematically DB1 implemented using a JEDEC DDR4 LRDIMM compliant data buffer according to some embodiments, DB1 includes DB control circuits 1100A, a DQ path, a DQS path, and bus-side DQS I/O circuitry (e.g., an input buffer 1101a and an output driver 1102a) coupled to each DQS line in a respective segment of the data bus 312 for conducting (e.g., receiving or transmitting) the DQS signal, which may include a differential pair of DQS signals DQS_t and DQS_c. The DQS path includes module-side DQS I/O circuitry (e.g., an input buffer 1111a and an output driver 1112a) coupled to each set of DQS line(s) 1011 for conducting (e.g., receiving or transmitting) the DQS1 signal, which may include a differential pair of DQS signals DQS1_t and DQS1_c. The DQ path includes bus-side DQ I/O circuitry (e.g., an input buffer 1131a, an input data sampler 1151a, and an output driver 1132a) coupled to each DQ line in the respective segment of the data bus 312, module-side DQ I/O circuitry (e.g., an input buffer 1141a, an input data sampler 1161a, and an output driver 1142a) coupled to each data line in the module data lines 1010, and internal circuitry (e.g., first-in-and-first-out circuits for write data or write FIFO, and first-in-and-first-out circuits for read data or read FIFO) coupled between the bus-side DQ IO circuitry and module-side DQ I/O circuitry. The DB control circuits 1100A is configurable to receive DB1 control signals, which includes a module clock and a first set of BCOM signals, and to output various control signals to control the circuits/components in DB1, including, for example, RX1_EN for enabling or disabling the input buffers 1101a, DQS1_OE for enabling or disabling the output drivers 1102a, RX1EN for enabling or disabling the input buffer 1111a, MDQS1_OE for enabling or disabling the output drivers 1112a, DQ1_OE for enabling or disabling the output drivers 1132a, and MDQ1_OE for enabling or disabling the output drivers 1142a, etc. In some embodiments, the DB control circuits 1100A also includes circuits configurable to regenerate the DQS1 signal(s) as buffered DQS signal received at the input buffer 1101*a* from the data bus 312, and circuits configurable to regenerate the DQS signal as buffered DQS1 signal received at the input buffer 1111*a* from module DQS signal line(s) 1011.

Figure 11C:
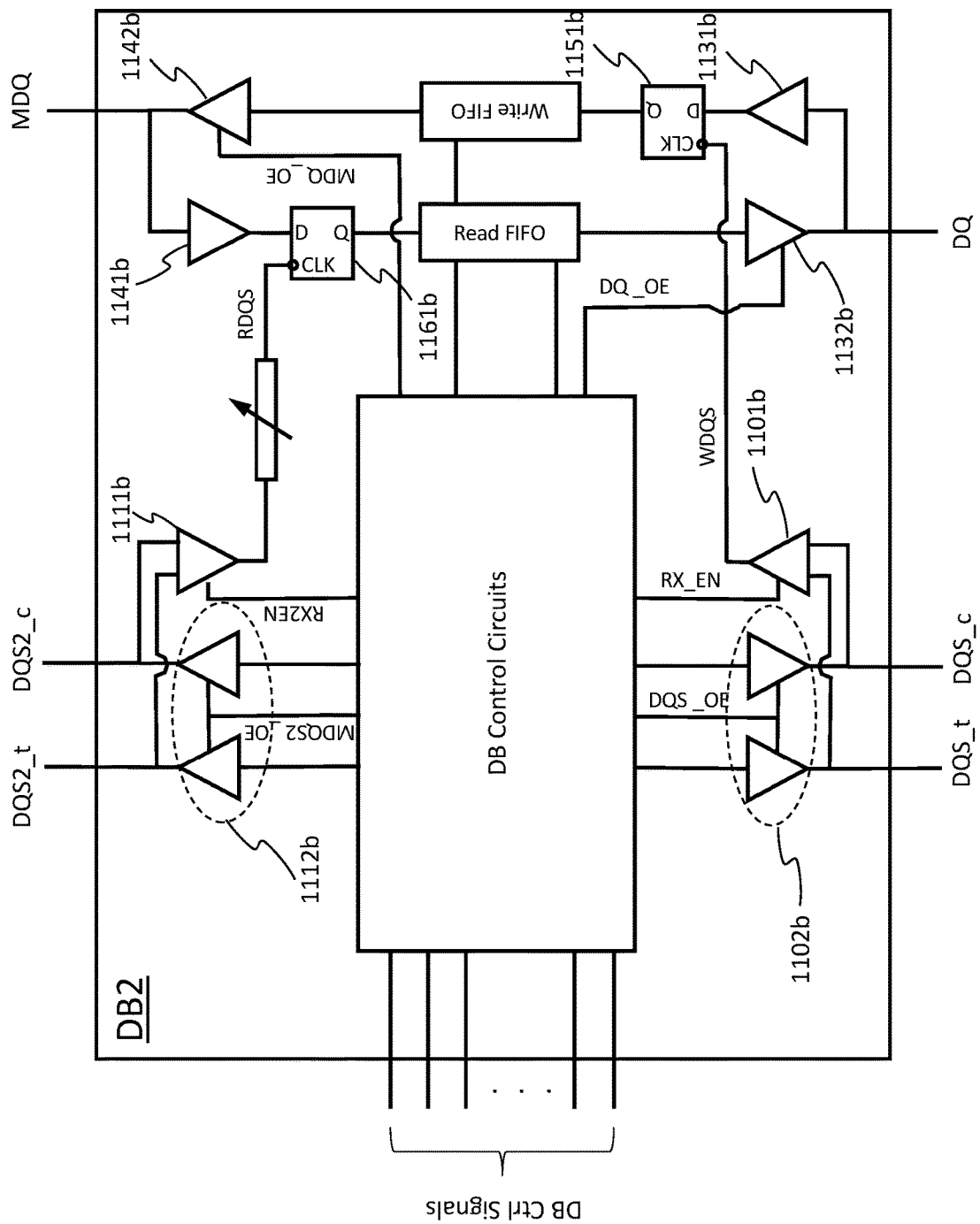

As shown in FIG. 11C, which illustrates schematically DB2 implemented using a JEDEC DDR4 LRDIMM compliant data buffer according to some embodiments, DB2 includes DB control circuits 1100B, a DQ path, a DQS path, and bus-side DQS I/O circuitry similar to that in DB1. The DQS path in DB2 includes module-side DQS I/O circuitry (e.g., an input buffer 1111*b* and an output driver 1112*b*) coupled to each set of DQS line(s) 1012 for conducting the DQS2 signal, which may include a differential pair of DQS signals DQS2_t and DQS2_c. The DQ path in DB2 includes bus-side DQ I/O circuitry (e.g., an input buffer 1131*b*, an input data sampler 1151*b*, and an output driver 1132*b*) coupled to each DQ line in the respective segment of the data bus 312, module-side DQ I/O circuitry (e.g., an input buffer 1141*b*, an input data sampler 1161*b*, and an output driver 1142*b*) coupled to each data line in the module data lines 1010, and internal circuitry (e.g., first-in-and-first-out circuits for write data or write FIFO, and first-in-and-first-out circuits for write data or read FIFO) coupled between the bus-side DQ IO circuitry and module-side DQ I/O circuitry. The DB control circuits 1100B is configurable to receive DB2 control signals, which includes a module clock and a second set of BCOM signals, and to output various control signals to control the circuits/components in DB2, including, for example, RX2_EN for enabling or disabling the input buffers 1102*b*, DQS2_OE for enabling or disabling the output drivers 1102*b*, RX2EN for enabling or disabling the input buffer 1111*b*, MDQ2_OE for enabling or disabling the output drivers 1142*b*, DQ2_OE for enabling or disabling the output drivers 1132*b*, and MDQ2_OE for enabling or disabling the output drivers 1142*b*, etc. In some embodiments, the DB control circuits 1100B also includes circuits configurable to regenerate the DQS2 signal(s) as buffered DQS signal received at the input buffer 1101*b* from the data bus 312, and circuits configurable to regenerate the DQS signal as buffered DQS2 signal received at the input buffer 1111*b* from module DQS signal line(s) 1012.

In some embodiments, the Sys_WR command to data buffers DB for DRAM_WR or SD×WR operations can be implemented as a combination of two Write commands, a Write command to DB1 using the first set of BCOM signals and a Write command to DB2 using the second set of BCOM signals. The DDR×WR command to data buffers DB for DD×WR operations can be implemented as a combination of a Write command to DB1 using the first set of BCOM signals and a No-op command to DB2 using the second set of BCOM signals. The RD command to data buffers DB for DRAM-RD, DD×RD and SD×RD operations can be implemented as a combination of a No-op command to DB1 using the first set of BCOM signals and a Read command to DB2 using the second set of BCOM signals.

In some embodiments, one of the two commands received by DB1 and DB2, respectively, can be issued by the RCD and another one of the two commands can be issued by the HMC. In some embodiments, both of the two commands can be issued by either the RCD or the HMC. In some embodiments, the RCD and the HMC are combined in one integrated circuits. In some embodiments, the RCD and the HMC are separate integrated circuits. In some embodiments, the RCD can be a standard RCD (e.g., JEDEC DDR4 RDIMM or LRDIMM RCD).

In some embodiments, as shown in FIG. 11A, the DQS signal paths between the memory devices 510 and the data bus 312 can be provided by DB1, while the DQ signal paths through data buffer DB can be provided by DB2, which also provides the DQS signal paths between HMC and the system (HOST). In some embodiments, the DQS signals from the system is optionally buffered and output from DB1 to the HMC for drift alignment, as indicated by the dashed line in FIG. 11A. As discussed further below, in some embodiments, the configuration of the HybriDIMM 300, as shown in FIGS. 10A and 11A, provides one source of DQS for the DRAMs for write operations and one source of DQS for read operations. For example, for Write cycles (DRAM-WR, DD×WR, SD×WR), DB1 drives the DQS from MemC, and for Read cycles (DRAM-RD, DD×RD, SD×RD), DQS originates from HMC 330 (e.g., DQS is output in response to, or by the same integrated circuit that receives, the read strobes DQS2 from HMC 330).

TABLE II

| | | BCOM command | |
|---|---|---|---|
| Module Operations | DB Command | DB1 | DB2 |
| DRAM-WR | Sys_WR | Write | Write |
| SD×WR | Sys_WR | Write | Write |
| DD×WR | DD×WR | Write | No-op |
| DRAM-RD | RD | No-op | Read |
| SD×RD | RD | No-op | Read |
| DD×RD | RD | No-op | Read |

Table II illustrates the commands received by DB 520 (DB Command), which is a combination of commands received by DB1 and DB2 (BCOM Command), during various read and write operations according to some embodiments. As shown in Table II, during a MemC write (DRAM-WR or SD×WR) operation, the data buffers DB 520 receive Sys_WR command, which, in the dual-buffer implementation, can be a combination of two write commands, a Write command to DB1 and a Write command to DB2. Thus, for both the DRAM-WR operation and the SD×WR operation, the DQS is driven from the HOST MC 106 to the DRAM via DB1, while the DQ is driven from the HOST MC 106 to the DRAM via DB2. The HMC receives both the MDQ and DQS2 signals via DB2. Although both DRAM and HMC receive DQS/DQ signals, the target (e.g., DRAM or NVM) is distinguished by chip-select signals and/or device ID signals in the control/address signals during the command cycle.

During DD×WR operations, the data buffers DB 520 receive a DD×WR command, which, in dual-buffer implementation shown in FIG. 10A, can be a combination of a Write command to DB1 and a No-op command to DB2. Thus, for the DD×WR operations, DB2 is disabled, the DQS is driven from the HOST to the DRAM via DB1, while the DQ is driven from the HMC to the DRAM via DQ signal lines in DQ/DQS signal lines 456. Thus, the source of DQS remains the same as in the DRAM-WR and SD×WR operations. Since MemC write or DD×WR cycle is initiated by Host (MemC), DQS from host is available for either MemC write or DD×WR operations. Any data signals from the memory controller, however, are blocked by DB2 during DD×WR operations to reduce noise, as the DQ output drivers 1142*b* on DB2 are tristated or disabled when DB2 is under the No-op command.

During DRAM-RD operations, in which the data buffers DB 520 receive a RD command, which, in dual-buffer implementation, can be a combination of a No-op command to DB1 and a Read command to DB2. Thus, for the DRAM-RD operations, DB1 is disabled, DQS is driven from the HMC to the host via DB2, and DQ is driven from the DRAM to the host via DB2 as well. The DQS signals from the DRAM is blocked from reaching the data bus by DB1 during DRAM_RD operations. The host can manage the timing between DQS from HMC and DQ from DRAM through Read Leveling during boot-up-training. Optional DQS from DRAM to HMC, as indicated by the dashed signal line in FIG. 11A, may be implemented, so that HMC can detect any drift on DRAM output by voltage/temperature, etc. and align them in real-time.

During SDxRD operations, in which the data buffers DB 520 receive the RD command, which, in dual-buffer implementation, can be a combination of a No-op command to DB1 and a Read command to DB2. Thus, for the SDxRD operations, DB1 is disabled, DQS is driven from the HMC to the host via DB2, and DQ is driven from the HMC to the host via DB2 as well.

During DDxRD operations, in which the data buffers DB 520 receive the RD command, which, in dual-buffer implementation, can be a combination of a No-op command to DB1 and a Read command to DB2. Thus, for the DDxRD operations, DB1 is disabled, DQS is driven from the HMC to the host via DB2, while DQ is driven from the DRAM to the HMC and DB2. Because the host has initiated this read-cycle via a dummy read memory command, the host expects DQS and data from the memory module, even though the host will ignore these DDxRD data. Thus, for any of the DRAM-RD, SDxRD, and DDxRD operations, the source of DQS is HMC.

In some embodiments, DB1 and DB2 can be mounted on a PCB using Top and Bottom layers and back-to-back (mirrored) configuration, so there's no stub or nearly no stub on DQS from the host. Though the loading on DQS signals from host may be doubled with the dual-buffer implementation, the loading can be managed through IBT on/off and adjusting series damping resistor values. Optional DQS input (from DRAM to HMC) allows drift alignment in real-time, but it could increase pin-count on HMC (4×9=36).

Figure 11D:
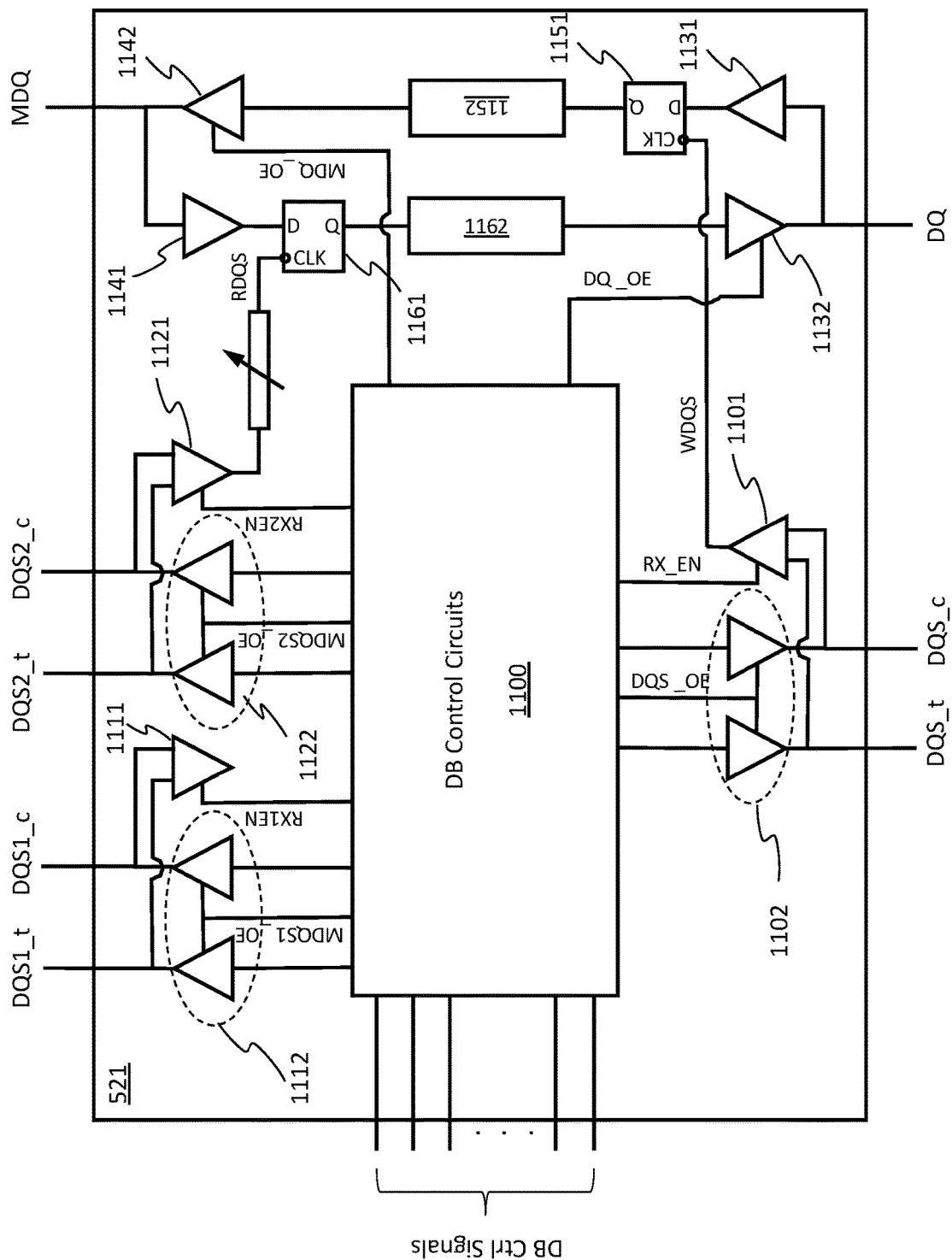
FIG. 11D is a schematic diagram of a data buffer implemented in an integrated circuit, according to some embodiments.

FIG. 11D illustrates schematically the data buffer 520 implemented in a single integrated circuit 521, according to some embodiments. As shown in FIG. 11D, DB 521 includes a DQ path that is similar to that in DB1 or DB 2. DB 521 includes two DQS paths, a first DQS path corresponding to DQS1 and similar to the DQS path in DB1 and a second DQS path corresponding to DQS2 and similar to the DQS path in DB2, and a DB control circuits 1100 that is configurable to facilitate and control the two DQS paths independently of each other in response to receiving DB control signals, which includes the module clock and DB command signals. In some embodiments, based on the DB command (e.g., Sys-WR, DDxWR and RD, etc.) received by DB 521, the DB control circuits 1100 is configurable to receive or output DQS, DQS1 and/or DQS2 signals, and to output control signals MDQS1_OE, RX1EN, MDQS2_OE, RX2EN, DQS_OE, RX_EN, MDQ_OE, DQ_OE, etc. to control the DQ and DQS I/O circuits in DB 521. Table III illustrates the commands for DB 521 to carry out the DRAM-WR, SDxWR, DDxWR, DRAM-RD, SDxRD, and DDxRD operations described above, and the control signals generated by the DB control circuits 1100 in response to each of the commands, in accordance with some embodiments.

TABLE III

| | Sys-WR | | DDxWR | RD | | |
| --- | --- | --- | --- | --- | --- | --- |
| | DRAM-WR | SDxWR | DDxWR | DRAM-RD | SDxRD | DDxRD |
| DQS_OE | 0 | 0 | 0 | 1 | 1 | 1 |
| RX_EN | 1 | 1 | 1 | 0 | 0 | 0 |
| MDQ_OE | 1 | 1 | 0 | 0 | 0 | 0 |
| DQ_OE | 0 | 0 | 0 | 1 | 1 | 1 |
| MDQS1_OE | 1 | 1 | 1 | 0 | 0 | 0 |
| RX1EN | 0 | 0 | 0 | 0 | 0 | 0 |
| MDQS2_OE | 1 | 1 | 0 | 0 | 0 | 0 |
| RX2EN | 0 | 0 | 0 | 1 | 1 | 1 |

For example, in response to the Sys-WR command, which can be provided to DB 521 by the RCD 530 or HMC 330 in a set of command signals, the DB control circuits 1100 is configurable to enable the input buffer 1101, using the RX_EN signal, to receive the DQS signal from the system, to regenerate the DQS1 and DQS2 signals as buffered DQS signals, to enable the output drivers 1112, using the MDQS1_OE signal, to drive the DQS1 signal to the memory device(s) 510, and to enable the output drivers 1122, using the MDQS2_OE signal, to drive the DQS2 signal to the HMC 330. In response to the DDxWR command, which can be provided to DB 521 by the RCD 530 or HMC 330 in another set of command signals, the DB control circuits 1100 is configurable to enable the input buffer 1101, using the RX_EN signal, to receive the DQS signal from the system, to regenerate the DQS1 signal(s) as buffered DQS signal(s), and to enable the output drivers 1112, using the MDQS1_OE signal, to drive the DQS1 signal to the memory device(s) 510. The output drivers 1122 are disabled using the MDQS2_OE signal under the DDxWR command. In response to the RD command, which can be provided to DB 521 by the RCD 530 or HMC 330 in yet another set of command signals, the DB control circuits 1100 is configurable to enable the input buffer 1221, using the RX2EN signal, to receive the DQS2 signal from the HMC 330, to regenerate the DQS signal(s) as buffered DQS1 signal(s), and to enable the output drivers 1102, using the DQS_OE signal, to drive the DQS signal to the MC 106. The input buffers 1101, 1111, and output drivers 1112 and 1122 are disabled using respective control signals under the RD command.

Figure 12:
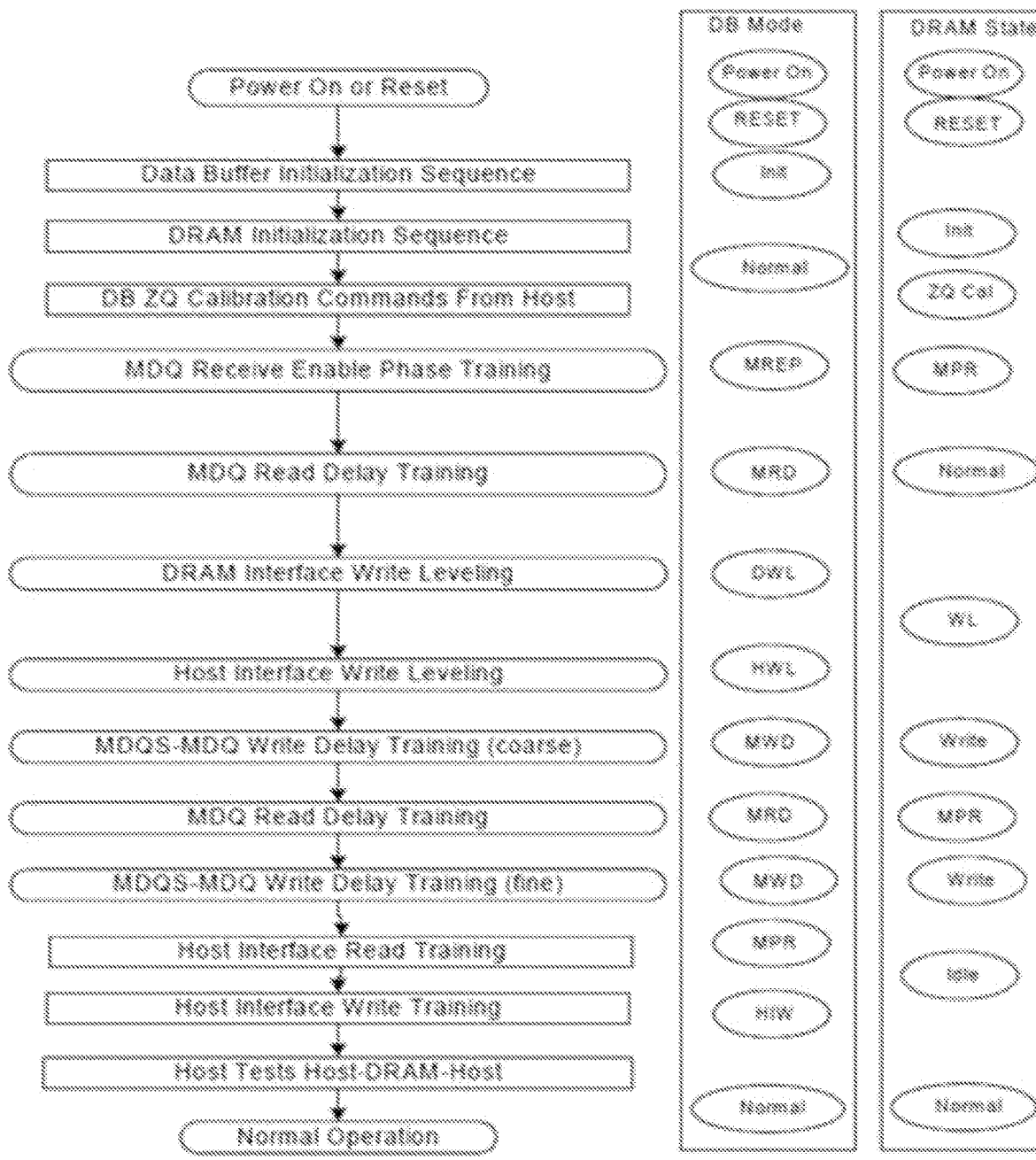
FIG. 12 is a flowchart of a procedure for training data buffers in a memory module according to some embodiments.

FIG. 12 is a flowchart of a procedure for training the data buffers (DB) 520 according to some embodiments. In the dual-buffer implementation of DB 520, besides the aforementioned BCOM commands (e.g., Write, Read, NOP), all other BCOM commands (e.g., MSR write, BCW write, BCW read) are copied on both DB1 & DB2. So, both DB1 and DR2 would be programmed the same. MREP training is done through DB2 according to some embodiments.

The MREP training step trains the partial cycle fields in the DRAM interface receive enable control words to their correct position, aligned with the strobes coming from the DRAMs. However, in the presence of large command delay differences between DRAM and the data buffer, the full cycle fields in the DRAM interface receive enable control words may also need adjustment so that the data buffer receivers are enabled in the correct cycle. To accomplish this task, the host can put the data buffer into MRD mode by a BCW write to BCOC. In the MRD mode, the host writes a known pattern to the DRAM MPR registers and also into the MPR registers of the data buffer and read it back, allowing the data buffer to compare the read data with the known pattern.

We claim:

1. A memory module operable in a computer system, the computer system including a memory controller coupled to a memory channel, the memory channel including a data bus and a control/address (C/A) bus, comprising:
   a volatile memory subsystem configurable to be coupled to the memory channel, the volatile memory subsystem including dynamic random access memory (DRAM) devices;
   a module controller coupled to the volatile memory subsystem;
   first data paths and first strobe paths between the DRAM devices and the data bus; and
   second data paths between the module controller and the DRAM devices;
   wherein, during a first data transfer operation to transfer data to the volatile memory subsystem:
      the first data paths are configured to receive first data from the memory controller via the data bus, and is not configured to output any data to the DRAM devices;
      the first strobe paths are configured to receive the first data strobes from the memory controller via the data bus and to output first write data strobes to the DRAM devices in response to receiving the first data strobes;
      the module controller is configurable to output second data associated with the data transfer operation;
      the second data paths are configured to pass the second data to the DRAM devices as first write data accompanying the first write data strobes, the first write data being distinct from the first data; and
      the DRAM devices are configured to receive the first write data strobes and to receive the first write data using the first write data strobes.

2. The memory module of claim 1, further comprising:
   a non-volatile (NV) memory subsystem coupled to the module controller;
   wherein, during the first data transfer operation, the module controller is further configurable to receive third data from the NV memory subsystem before outputting the second data, the second data being obtained from the third data.

3. The memory module of claim 2, wherein the memory module further comprises second strobe paths between the module controller and the data bus, wherein the memory module is further configurable to perform a second data transfer operation to transfer data to the NV memory subsystem, and wherein, during the second data transfer operation:
   the module controller is configurable to receive fourth data and to output fourth data strobes;
   the first data paths are configured to also receive the fourth data and to output the fourth data to the data bus; and
   the second strobe paths are configured to receive the fourth data strobes and to output read data strobes to the data bus in response to receiving the fourth data strobes.

4. The memory module of claim 3, wherein, during the second data transfer operation:
   the volatile memory subsystem is configured to output the fourth data; and
   the second data paths are configured to pass the fourth data to the module controller.

5. The memory module of claim 4, wherein the memory module is configured to receive a memory read command associated with the second data transfer operation from the memory controller via the C/A bus, and wherein the volatile memory subsystem is configured to output the fourth data in response to the memory read command.

6. The memory module of claim 1, wherein the memory module is configurable to receive a memory write command associated with the first data transfer operation from the memory controller via the C/A bus prior to receiving the first data and the first data strobes via the data bus, and wherein the volatile memory subsystem is configured to receive the first write data strobes and to receive the first write data using the first write data strobes in response to the memory write command.

7. The memory module of claim 1, wherein the memory module is further configurable to perform a memory write operation, and wherein, during the memory write operation:
   the memory module is configurable to receive third data and third data strobes associated with the memory write operation from the memory controller via the data bus;
   the first data paths are configured to receive the third data from the data bus and to output second write data to the DRAM devices based on the third data;
   the first strobe paths are configured to receive the third data strobes from the data bus and to output second write data strobes to the DRAM devices in response to receiving the third data strobes; and
   the DRAM devices are configured to receive the second write data strobes and to receive the second write data using the second write data strobes.

8. A data buffer operable in a memory module in a computer system, the computer system including a memory controller coupled to a memory channel, the memory channel including a data bus and a control/address (C/A) bus, the memory module including a volatile memory subsystem configurable to be coupled to the memory channel and a module controller coupled to the volatile memory subsystem, the volatile memory subsystem including dynamic random access memory (DRAM) devices, the data buffer comprising:
   a first data path configurable to transmit data between one or more DRAM devices in the volatile memory subsystem and the data bus;
   a first strobe path configurable to transmit data strobes between the one or more DRAM devices and the data bus; and
   control circuits configured to control the first data path and the first strobe path in response to control signals received by the data buffer;
   wherein, during a first data transfer operation to transfer data to the volatile memory subsystem:

the first data path is configured to receive first data from the memory controller via the data bus, and is not configured to output any data to the one or more DRAM devices; and the first strobe path is configured to receive one or more first data strobes from the data bus and to output to the one or more DRAM devices one or more write data strobes accompanying write data associated with the first data transfer operation, the write data strobes are used by the one or more DRAM devices to receive the write data, the write data being distinct from the first data.

9. The data buffer of claim 8, further comprising a second strobe path configurable to transmit data strobes between the module controller and the data bus, wherein the first strobe path is configurable to be enabled or disabled by the control circuits independently of the second strobe path being enabled or disabled by the control circuits.

10. The data buffer of claim 9, wherein the first strobe path is in a first integrated circuit and the second strobe path is in a second integrated circuit.

11. The data buffer of claim 10, wherein the first data path is in the first or the second integrated circuit.

12. The data buffer of claim 11, wherein the first integrated circuit and the second integrated circuit are identical.

13. The data buffer of claim 12, wherein the control circuits are configurable to, during the first data transfer operation and in response to the control signals:

disable the first data path to prevent any data signals from being transmitted to the one or more DRAM devices; and enable the first strobe path to output the first write data strobes.

14. The data buffer of claim 13, wherein the control circuits include first control circuits in a first integrated circuit and second control circuits in a second integrated circuit, and wherein the control signals include a first set of control signals received by the first integrated circuit and a second set of control signals received by the second integrated circuit.

15. A method, comprising:
at a memory module operable in a computer system, the computer system including a memory controller coupled to a memory channel, the memory channel including a data bus and a control/address (C/A) bus, the memory module including volatile memory subsystem coupled to the memory channel and a module controller coupled to the volatile memory subsystem, the volatile memory subsystem including dynamic random access memory (DRAM) devices;

performing a first data transfer operation to transfer data to the volatile memory subsystem, including:
receiving first data and first data strobes associated with the first data transfer operation from the memory controller via the data bus;

providing write data and write data strobes to the DRAM devices, where the first write data are output by the module controller and are distinct from the first data, and wherein the first write data strobes are provided to the DRAM devices in response to the first data strobes;

receiving the first write data strobes at the volatile memory subsystem; and receiving the first write data using the first write data strobes at the volatile memory subsystem.

16. The method of claim 15, wherein the memory module further comprises a non-volatile (NV) memory subsystem coupled to the module controller, the method further comprising, during the first data transfer operation:

receiving third data from the NV memory subsystem by the module controller before providing the first write data to the DRAM devices, the first write data being obtained from the third data.

17. The method of claim 16, further comprising: performing a second data transfer operation to transfer data to the NV memory subsystem, including:
passing fourth data output from at least some of the DRAM devices to the module controller;
transmitting read data to the data bus, the read data being derived from the fourth data; and
transmitting read data strobes to the data bus in response to receiving fourth data strobes from the module controller.

18. The method of claim 17, wherein the volatile memory subsystem is configured to output the fourth data in response to a memory read command received from the memory controller via the data bus.

19. The method of claim 15, further comprising, before receiving the first data and the first data strobes associated with the first data transfer operation from the memory controller via the data bus, receiving a memory write command associated with the first data transfer operation from the memory controller via the C/A bus, and wherein the volatile memory subsystem is configured to receive the first write data strobes and to receive the first write data using the first write data strobes in response to the memory write command.

20. The method of claim 15, further comprising performing a memory write operation, including:
receiving third data and third data strobes associated with the memory write operation from the memory controller via the data bus;
providing second write data to the DRAM devices, the second write data being derived from the third data;
providing the second write data strobes to the DRAM devices in response to receiving the third data strobes;
receiving the second write data strobes at the volatile memory subsystem; and
receiving the second write data using the second write data strobes at the volatile memory subsystem.

* * * * *